United States Patent
Dan

(10) Patent No.: US 7,365,765 B2
(45) Date of Patent: Apr. 29, 2008

(54) APPARATUS FOR FORMING IMAGE AND METHOD OF CONTROLLING SAME APPARATUS IN SELF-DIAGNOSTIC MANNER

(75) Inventor: Kenichi Dan, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 272 days.

(21) Appl. No.: 11/200,901

(22) Filed: Aug. 9, 2005

(65) Prior Publication Data

US 2006/0033804 A1  Feb. 16, 2006

(30) Foreign Application Priority Data

Aug. 10, 2004  (JP) ............................. 2004-233819

(51) Int. Cl.
B41J 27/00  (2006.01)
(52) U.S. Cl. .................................................... 347/261
(58) Field of Classification Search ........ 347/234–235, 347/243, 247–250, 259–261, 231; 250/236
See application file for complete search history.

(56) References Cited

U.S. PATENT DOCUMENTS 5,039,998 A * 8/1991 Seto ............................ 347/247
5,576,536 A * 11/1996 Hiramatsu et al. .......... 250/236
6,064,419 A * 5/2000 Uchiyama .................... 347/250
2005/0024480 A1* 2/2005 Yamazaki .................... 347/243

FOREIGN PATENT DOCUMENTS

JP          10-35007 A        2/1998
JP       2003025628 A    *   1/2003

* cited by examiner

Primary Examiner—Hai Pham
(74) Attorney, Agent, or Firm—Darby & Darby P.C.

(57) ABSTRACT

An apparatus for forming an image is disclosed which includes a scanner motor rotatably driving a polygon mirror; a laser light emitter emitting laser light; a generator detecting the laser light reflected off from the polygon mirror, thereby generating a first periodic signal; a generator detecting rotation of the scanner motor, thereby generating a second periodic signal; and a controller performing speed control of the scanner motor, based on at least one of the first and the second periodic signal. The controller makes a first determination as to whether a pre-selected one of the first and the second periodic signal is abnormal. Upon the pre-selected signal being abnormal, the controller makes a second determination as to whether a remaining one of the first and the second periodic signal is normal, and based on a result of the second determination, the controller identifies at least one failed element of the apparatus.

21 Claims, 8 Drawing Sheets

APPARATUS FOR FORMING IMAGE AND METHOD OF CONTROLLING SAME APPARATUS IN SELF-DIAGNOSTIC MANNER

This application is based on Japanese Patent Application No. 2004-233819 filed Aug. 10, 2004, the content of which is incorporated hereinto by reference.

CROSS-REFERENCE TO RELATED APPLICATIONS

Not Applicable.

BACKGROUND OF THE INVENTION

1. Field of the Invention

The invention relates to apparatuses for forming an image because of an optical scan of laser light by a polygon mirror on which the laser light is incident and which is rotated by a scanner motor, and more particularly to apparatuses in which a periodic signal reflecting the laser light leaving the polygon mirror in an angularly oscillatory manner, and a periodic signal reflecting the rotation of the scanner motor are each useable as a signal indicative of the rotational speed of the scanner motor.

2. Description of the Related Art

There has been already known apparatuses for formatting an image because of an optical scan of laser light by a polygon mirror on which the laser light is incident and which is rotated by a scanner motor. An example of such apparatuses is a laser printer.

For such apparatuses, a technique of speed control of the scanner motor has been already proposed as a technique of controlling the speed of the scanner motor using two periodic signals different in type, one of which is a frequency-generator signal (hereinafter, referred to as "FG signal") produced as a result of the detection of the rotation of a rotary body rotating with the scanner motor, the other of which is a beam-detector signal (hereinafter, referred to as "BD signal") produced depending on the scanning period of the laser light.

In general, such apparatuses are each adapted to include a scanner motor driving a polygon mirror for rotation, and a laser light emitter (e.g., a laser diode) emitting laser light onto the polygon mirror.

Such apparatuses are each also adapted to further include a first periodic-signal generator (e.g., a beam detector BD), a second periodic-signal generator (e.g., a frequency generator FG), and a controller.

The first periodic-signal generator detects the laser light reflected off from the polygon mirror, to thereby generate a first periodic-signal (e.g., the BD signal) depending on the scanning period of the laser light. The second periodic-signal generator detects directly or indirectly the rotation of the scanner motor, to thereby generate a second periodic-signal (e.g., the FG signal) depending on the rotational speed of the polygon mirror.

The controller performs speed control of the scanner motor, based on the first periodic-signal outputted from the first periodic-signal generator and the second periodic-signal outputted from the second periodic-signal generator.

For example, Japanese Publication No. Hei 10-035007 of Japanese Patent Application discloses an example of a conventional technique of controlling the speed of a scanner motor using two kinds of periodic-signals (the BD and the FG signal), as described above.

More specifically, in the example, the speed control is performed based on the FG signal at the start-up of a driving operation of the scanner motor, and is switched to the speed control based on the BD signal. That is to say, in the example, the type of the signal for use in the speed control is changed from the FG signal to the BD signal.

Further, in the example, if the rotational speed of the scanner motor exceeds an allowable range during the speed control using the BD signal, then it is determined that the BD signal has become abnormal, resulting in the change-over to the speed control using the FG signal.

BRIEF SUMMARY OF THE INVENTION

For an apparatus allowing speed control of a scanner motor using two types of periodic signals in a manner as described above, a case can be considered in which a pre-selected one of these two signals becomes abnormal during the speed control using the pre-selected signal.

In the above example of the conventional technique disclosed in the above-referenced Japanese Publication, if a pre-selected one of the two periodic signals becomes abnormal during speed control of the scanner motor using the pre-selected signal (i.e., the BD signal), then the signal used as a reference signal of the speed control is changed from the pre-selected signal to the remaining signal (i.e., the FG signal). In this example, the reference signal of the speed control is changed in type, without diagnosing the cause of the abnormality occurring in the pre-selected signal.

A BD signal is a signal which is outputted from a beam detector (BD), and is also a signal which reflects laser light reflected off from a polygon mirror rotated by a scanner motor. Therefore, the BD signal is varied depending on the operational state of the beam detector, the operational state of the scanner motor, the operational state of the polygon mirror, and the operational state of a laser light emitter emitting laser light toward the polygon mirror.

On the other hand, an FG signal is a signal which is outputted from a frequency generator (FG), and is also a signal which reflects the rotational speed of the scanner motor. Therefore, the FG signal is varied depending on the operational state of the FG, and the operational state of the scanner motor.

The example of the conventional technique described above fails to make a decision, prior to a change-over of the signal used as a reference signal of the speed control from the BD signal to the FG signal, as to whether or not each of these laser light emitter and the scanner motor shows an abnormality. Therefore, it is presumed that the above example has been designed on the precondition that the laser light emitter and the scanner motor are each normally operable throughout the operation of the speed control.

For the above reason, the above example faces, after there is made a change-over of a reference signal of the speed control of the scanner motor from the BD signal to the FG signal, for avoiding drawbacks of the speed control due to an abnormality of the BD signal, the possibility of performing the speed control using the FG signal with the laser light emitter or the scanner motor being abnormal.

Thus, in the above example, once an abnormality is detected in one of two types of periodic signals, a reference signal of the speed control of the scanner motor is changed in type, without experiencing diagnosis of the cause of the detected abnormality. As a result, when this example is implemented, even the change in type of the reference signal of the speed control entails the possibility of failing to restore the speed control.

More specifically, in this example, upon detection of an abnormality in the BD signal, the reference signal of the speed control of the scanner motor is changed from the BD signal to the FG signal, without experiencing diagnosis of the cause of the detected abnormality in the BD signal, and after the reference signal is changed to the FG signal, the speed control is continued using the FG signal, even if the laser light emitter or the scanner motor shows an abnormality.

For example, after a fault in the laser light emitter occurs and this brings the apparatus into a state in which the apparatus is not capable of forming an image, and causes the BD signal to become abnormal, if the speed control of the scanner motor is nevertheless continued using the FG signal, then a recording medium on which an image is formed is spent uselessly.

In addition, after the scanner motor malfunctions and this causes the BD signal to become abnormal, if the speed control of the scanner motor is nevertheless continued using the FG signal, then the polygon mirror, which is held stationary because of inoperability of the scanner motor, is kept receiving the laser light.

In this case, the laser light, after entry into the polygon mirror, leaves the polygon mirror at the same angle as when the laser light enters the polygon mirror, without experiencing an expected deflection by the polygon mirror. For this reason, the laser light outgoing from the polygon mirror is kept entering a light receiver receiving the laser light (e.g., a photosensitive body) locally at the same position within a scanned area of the light receiver, resulting in the creation of the possibility that the light receiver is damaged due to the laser light.

It is therefore an object of the present invention to provide for an image forming apparatus in which a periodic signal reflecting laser light leaving a polygon mirror in an angularly oscillatory manner, and a periodic signal reflecting the rotation of a scanner motor are each useable as a signal indicative of the rotational speed of the scanner motor, techniques of, once at least one of these periodic signals is brought into an abnormality, identifying the cause of the abnormality with an improved accuracy.

According to a first aspect of the present invention, there is provided an apparatus for forming an image.

The apparatus comprises:

a scanner motor rotatably driving a polygon mirror for optical scan;

a laser light emitter emitting laser light toward the polygon mirror;

a first-periodic-signal generator detecting the laser light reflected off from the polygon mirror, thereby generating a first periodic signal dependent on a scanning period of the laser light;

a second-periodic-signal generator detecting directly or indirectly rotation of the scanner motor, thereby generating a second periodic signal dependent on a rotational speed of the polygon mirror; and a controller performing speed control of the scanner motor, based on at least one of the first periodic signal generated from the first-periodic-signal generator, and the second periodic signal generated from the second-periodic-signal generator, wherein the controller makes a first determination as to whether or not a pre-selected one of the first and the second periodic signal is abnormal, wherein the controller, upon the pre-selected signal being determined to be abnormal, makes a second determination as to whether or not a remaining one of the first and the second periodic signal is normal, and wherein the controller identifies at least one failed element of the apparatus, based on a result of the second determination.

According to a second aspect of the present invention, there is provided a method of controlling an apparatus for forming an image.

The apparatus includes:

a scanner motor rotatably driving a polygon mirror for optical scan;

a laser light emitter emitting laser light toward the polygon mirror;

a first-periodic-signal generator detecting the laser light reflected off from the polygon mirror, thereby generating a first periodic signal dependent on a scanning period of the laser light; and a second-periodic-signal generator detecting directly or indirectly rotation of the scanner motor, thereby generating a second periodic signal dependent on a rotational speed of the polygon mirror.

The method comprises:

a speed control step of performing speed control of the scanner motor, based on at least one of the first periodic signal generated from the first-periodic-signal generator, and the second periodic signal generated from the second-periodic-signal generator;

a first determination step of making a first determination as to whether or not a pre-selected one of the first and the second periodic signal is abnormal;

a second determination step of, upon the pre-selected signal being determined to be abnormal, making a second determination as to whether or not a remaining one of the first and the second periodic signal is normal; and a failed element identification step of identifying at least one failed element of the apparatus, based on a result of the second determination.

Upon practice of the above apparatus or method, a first determination is made as to whether or not a pre-selected one of the first and the second periodic signal is abnormal or has failed. If the pre-selected signal is abnormal or has failed, then a second determination is made as to whether or not the remaining one of these two signals is normal. Based on the result of the second determination, at least one failed element of the apparatus for forming an image is identified or located.

Once the above apparatus or method is practiced, if the pre-selected signal is abnormal or has failed, then at least one failed element of the apparatus is identified by reference to not only information on faults or malfunctions in the apparatus, which is derived of the fact that the pre-selected signal is abnormal or has failed, but also information on fault of the apparatus, which is derived of the result of the second determination as to whether or not the remaining signal is normal.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
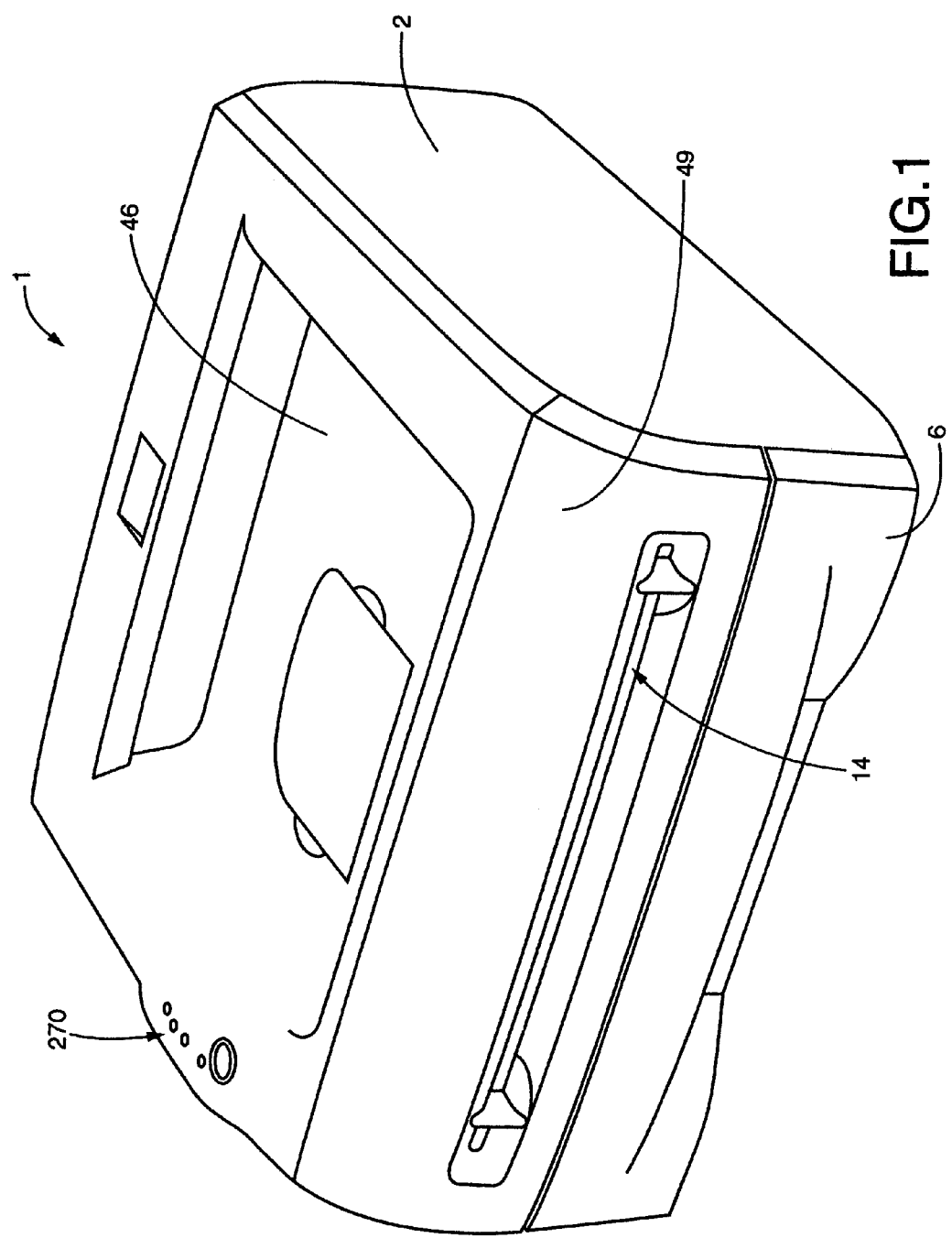
FIG. 1 is a perspective view illustrating a laser printer constructed according to an embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for forming an image, comprising:

a scanner motor rotatably driving a polygon mirror for optical scan;

a laser light emitter emitting laser light toward the polygon mirror;

a first-periodic-signal generator detecting the laser light reflected off from the polygon mirror, thereby generating a first periodic signal dependent on a scanning period of the laser light;

a second-periodic-signal generator detecting directly or indirectly rotation of the scanner motor, thereby generating a second periodic signal dependent on a rotational speed of the polygon mirror; and a controller performing speed control of the scanner motor, based on at least one of the first periodic signal generated from the first-periodic-signal generator, and the second periodic signal generated from the second-periodic-signal generator, wherein the controller makes a first determination as to whether or not a pre-selected one of the first and the second periodic signal is abnormal, wherein the controller, upon the pre-selected signal being determined to be abnormal, makes a second determination as to whether or not a remaining one of the first and the second periodic signal is normal, and wherein the controller identifies at least one failed element of the apparatus, based on a result of the second determination.

In the apparatus according to the above mode (1), a first determination is made as to whether or not a pre-selected one of the first and the second periodic signal is abnormal or has failed. If the pre-selected signal is abnormal or has failed, then a second determination is made as to whether or not the remaining one of these two signals is normal. Based on the result of the second determination, at least one failed element of the apparatus for forming an image is identified or located.

In the apparatus according to the above mode (1), if the pre-selected signal is determined to be abnormal, then at least one failed element of the apparatus is identified by reference to not only information on faults or malfunctions in the apparatus, which is derived of the fact that the pre-selected signal is abnormal or has failed, but also information on fault of the apparatus, which is derived of the result of the second determination as to whether or not the remaining signal is normal.

Therefore, the apparatus according to the above mode (1) allows the precondition inevitably required for identifying the at least one failed element of the apparatus, to become extensive, and the number of at least one element of the apparatus which is each ultimately identified as a failed element, to become small, as compared with those when at least one failed element of the apparatus is required to be identified by reference to only information on faults or malfunctions in the apparatus, which is derived of the fact that the pre-selected signal is abnormal.

As a result, the apparatus according to the above mode (1) allows improvement in the accuracy with which at least one failed element of the apparatus is identified or located, to thereby improve a self-diagnostic ability of the instant apparatus.

(2) The apparatus according to mode (1), wherein the controller comprises:

an abnormality detector detecting an abnormality of each of the first and the second periodic signal; and a failed element identifier, upon detection of the abnormality of the pre-selected signal by the abnormality detector, making a determination as to whether or not the remaining signal is normal, as the second determination, wherein the failed element identifier identifies the at least one failed element, based on a result of the second determination.

(3) The apparatus according to mode (1) or (2), wherein the controller comprises an annunciator informing the identified at least one failed element.

The apparatus according to the above mode (3) allows a user or a service technician to readily recognize or perceive at least one failed element of the instant apparatus.

(4) The apparatus according to any one of modes (1)-(3), wherein the controller implements the speed control by selectively using the first and the second period signal.

(5) The apparatus according to mode (4), wherein the controller selectively implements first speed control allowing the rotational speed of the scanner motor to be controlled based on the first periodic signal, and second speed control allowing the rotational speed of the scanner motor to be controlled based on the second periodic signal.

(6) The apparatus according to mode (5), wherein the pre-selected signal is the first periodic signal, while the remaining signal is the second periodic signal, wherein the controller, during implementation of the first speed control, makes a determination as to whether or not the first periodic signal is abnormal, as the first determination, wherein the controller, upon the first periodic signal being determined to be abnormal, makes a determination as to whether or not the second periodic signal is normal, as the second determination, and wherein the controller identifies the at least one failed element, based on a result of the second determination.

(7) The apparatus according to any one of modes (1)-(6), wherein the at least one failed element is selected from the group consisting of: the scanner motor, the laser light emitter, the first-periodic-signal generator, and the second-periodic-signal generator.

(8) The apparatus according to any one of modes (1)-(7), further comprising a nonvolatile storage, wherein the controller stores in the nonvolatile storage for conservation, information of the identified at least one failed element.

The apparatus according to the above mode (8) allows the result of the finding of at least one malfunctions in the apparatus to be retained even after the apparatus is powered down, facilitating the fault analysis or fault diagnosis of the apparatus.

(9) The apparatus according to any one of modes (1)-(8), wherein the controller makes a determination as to whether or not at least one of the scanner motor and the second periodic-signal generator has been identified as the at least one failed element, or whether or not at least one of the scanner motor and the second periodic-signal generator will be likely to be identified as the at least one failed element, and wherein the controller, if the determination is affirmative, deactivates the laser light emitter for terminating emission of the laser light from the laser light emitter.

Where at least one of the scanner motor and the second periodic-signal generator has failed, a normal operation for forming an image is not expected in the apparatus. Even in this case, if laser light enters a light receiver (e.g., a photosensitive body) which is illuminated with laser light, then the laser light is produced in no use, and the possibility arises that the light receiver is damaged due to the laser light.

In this regard, in the apparatus according to the above mode (9), if at least one of the scanner motor and the second periodic-signal generator has been identified as the at least one failed element, or if at least one of the scanner motor and the second periodic-signal generator is likely to be identified as the at least one failed element, then the laser light emitter is deactivated for terminating emission of the laser light from the laser light emitter.

Therefore, the apparatus according to the above mode (9) prevents the laser light from entering the light receiver in no use where a normal operation for forming an image is impossible, for example. As a result, the apparatus effectively protects the light receiver from being damaged due to the laser light, for example.

(10) The apparatus according to any one of modes (1)-(9), wherein the pre-selected signal is the first periodic signal, while the remaining signal is the second periodic signal, and wherein the controller, upon the first periodic signal being determined to be abnormal, deactivates the laser light emitter for terminating emission of the laser light from the laser light emitter.

In the apparatus according to the above mode (10), if the first periodic signal is determined to be abnormal, then the laser light emitter is deactivated for terminating emission of the laser light.

On the other hand, as described above, where the first periodic signal (e.g., a BD signal) is abnormal, there exist the possibility that the scanner motor is abnormal, and the possibility that the second periodic-signal generator (e.g., a frequency generator) is abnormal. If at least one of the scanner motor and the second periodic-signal generator is abnormal, then a normal operation for forming an image is not expected even if a reference signal for use in speed control of the scanner motor is changed in type.

In view of the above findings, in the apparatus according to the above mode (10), if the first periodic signal is abnormal, then at least one failed element of the apparatus is identified, and also the laser light emitter is deactivated. As a result, in the presence of an abnormality in the first periodic signal, the laser light emitter is prevented from continuing emitting laser light.

Therefore, the apparatus according to the above mode (10) prevents the laser light from wastefully entering a light receiver (e.g., a photosensitive body) which is illuminated with laser light, where a normal operation for forming an image is impossible, for example. As a result, the apparatus effectively protects the light receiver from being damaged due to the laser light, for example.

(11) The apparatus according to any one of modes (1)-(10), wherein the pre-selected signal is the first periodic signal, while the remaining signal is the second periodic signal, wherein the controller, upon the first periodic signal being determined to be abnormal, makes a determination as to whether or not the second periodic signal is normal, and wherein the controller, upon the second periodic signal being determined to be normal, identifies at least one of the laser light emitter and the first-periodic-signal generator as the at least one failed element, and wherein the controller, upon the second periodic signal being determined to be abnormal, identifies at least one of the scanner motor and the second-periodic-signal generator as the at least one failed element.

In the apparatus according to the above mode (11), upon occurrence of an abnormality in the first periodic signal produced based on the laser light emitted from the polygon mirror, a determination is made as to whether or not the second periodic signal is normal reflecting the rotation of the scanner motor, and, based on the result of the determination, at least one failed element of the instant apparatus is identified or located.

Where the first periodic signal is abnormal or failed, there exist not only the possibility that the laser light emitter is abnormal, and the possibility that the first periodic-signal generator is abnormal, but also the possibility that the scanner motor is abnormal and the possibility that the second periodic-signal generator is abnormal.

Where the first periodic signal is abnormal, if the second periodic signal is normal, then the possibility that the scanner motor is abnormal and the possibility that the second periodic-signal generator is abnormal are each become recessive. Alternatively, if the second periodic signal is also abnormal, then the possibility that the scanner motor is abnormal and the possibility that the second periodic-signal generator is abnormal are each become dominant.

In light of the above findings described above, in the apparatus according to the above mode (11), after the first periodic signal is determined to be abnormal, if the second periodic signal is determined to be normal, then at least one of the laser light emitter and the first periodic-signal generator is identified as at least one failed element of the instant apparatus. On the other hand, if the second periodic signal is determined to be abnormal, then at least one of the scanner motor and the second periodic-signal generator is identified as at least one failed element of the instant apparatus.

Therefore, the apparatus according to the above mode (11) allows at least one failed element of the instant apparatus to be identified or located, by reference to not only information induced from the fact that the first periodic signal is abnormal, but also information induced from the result or content of a determination as to whether or not the second periodic signal is normal.

(12) The apparatus according to mode (11), wherein the controller, upon the first periodic signal being determined to be abnormal, deactivates the laser light emitter for terminating emission of the laser light from the laser light emitter, prior to the second determination.

In the apparatus according to the above mode (12), if the first periodic signal is determined to be abnormal, then the laser light emitter is deactivated earlier than where the apparatus is practiced so as not to deactivate the laser light emitter before a determination is made as to whether or not the second periodic signal is normal.

Therefore, the apparatus according to the above mode (12) earlier prevents the laser light from entering a light receiver which receives the laser light (e.g., a photosensitive body) in no use where a normal operation for forming an image is impossible, for example. As a result, the apparatus effectively earlier protects the light receiver from being damaged due to the laser light, for example.

(13) The apparatus according to any one of modes (1)-(12), wherein the controller implements second speed control allowing the rotational speed of the scanner motor to be controlled based on the second periodic signal, after start-up of the scanner motor, before establishment of a predetermined condition for change over, wherein the controller changes the speed control of the scanner motor into first speed control allowing the rotational speed of the scanner motor to be controlled based on the first periodic signal, after the establishment of the predetermined condition for change over, and wherein the controller identifies the at least one failed element, upon detection of an abnormality of the first periodic signal during implementation of the first speed control.

In general, after a drive start point of time at which the scanner motor starts up, the closer to the drive start point of time it is, the more slowly the scanner motor is rotated. If the rotational speed of the scanner motor is low, then the rate at which the polygon mirror scans the laser light is also low.

For the above reasons, if, during such a low speed rotation of the scanner motor, the laser light is entered into the polygon mirror, and if the scanner motor is controlled based on the first periodic signal depending on light reflected off from the polygon mirror, then the possibility arises that the laser light enters a light receiver which receives the laser light (e.g., a photosensitive body) intensively at a single local area on the light receiver.

On the other hand, in the apparatus according to the above mode (13), after start-up of the scanner motor, before establishment of a predetermined condition for change over, the rotational speed of the scanner motor is controlled based on not the first periodic signal, the production of which requires the laser light from the polygon mirror, but the second periodic signal, the production of which requires no laser light.

Therefore, the apparatus according to the above mode (13) allows the speed control of the scanner motor, with the possibility that the laser light enters the light receiver intensively at a single local area thereon being more effectively reduced.

Further, in the apparatus according to the above mode (13), after the establishment of the predetermined condition for change over, the speed control of the scanner motor is performed based on the first periodic signal, the production of which requires the laser light from the polygon mirror.

Therefore, the apparatus according to the above mode (13) makes it easier, after the establishment of the predetermined condition for change over, to control the speed of the scanner motor more accurately than when the scanner motor is controlled based on the second periodic signal.

As will be clear from the above explanation, the apparatus according to the above mode (13) allows a reference signal used for the speed control of the scanner motor to be changed in type properly depending on the situation or environment in which the instant apparatus is placed, resulting in optimization of the speed control of the scanner motor, that is, rotation control of the polygon mirror.

An example of the "condition for change over" in the above apparatus may be established in response to elapse of a predetermined length of time after a start point of time at which the laser light starts entering the polygon mirror.

An alternative example of the "condition for change over" in the above apparatus may be established in response to both elapse of a predetermined length of time after a start point of time at which the laser light starts entering the polygon mirror, and detection of the first periodic signal.

(14) The apparatus according to mode (13), wherein the laser light emitter starts emission of the laser light upon establishment of a predetermined condition for start of emission, and wherein the controller changes the speed control of the scanner motor from the second speed control to the first speed control, after start of emission of the laser light from the laser light emitter.

In the apparatus according to the above mode (14), a timing at which the laser is emitted from the laser light emitter during which each cycle of an image formation job (e.g., a print job) is implemented by the instant apparatus, is not freely determined without depending on any other particular event, but determined depending on establishment of a given condition(s) including a condition which is satisfied when a particular point of time is arrived, or a condition which is satisfied when a particular event is performed. That is to say, the timing of start of emission of the laser light is previously adjusted.

Therefore, the apparatus according to the above mode (14) allows the timings of start of emission of the laser light during a plurality of successive cycles of image formation jobs, to be relatively coincident with one another, resulting in a stabilized capture process of the first periodic signals throughout these cycles of image formation jobs.

For the above reasons, the apparatus according to the above mode (14) eliminates the possibility that the result of the fault analysis performed by the controller is deteriorated because of unexpected variations in content of the first periodic signals, resulting in improvement in reliability of the fault diagnosis performed by the controller.

(15) The apparatus according to mode (13) or (14), wherein the controller is inhibited from identifying the at least one failed element, during a predetermined period after change of the speed control of the scanner motor from the second speed control to the first speed control.

In general, during a period immediately after the speed control of the scanner motor has been changed from the second speed control using the second periodic signal, into the first speed control using the first periodic signal, the possibility exists that the polygon mirror is placed in an unstable rotational state because of such as the fact that the scanner motor is operationally in a transitional state.

For the above reasons, during such a period, the possibility exists that the first periodic signal shows an abnormality, and therefore, if processing of identifying at least one failed element of the instant apparatus is performed nevertheless based on the first periodic signal, then the accuracy of the processing is likely to be deteriorated.

In light of the above findings, in the apparatus according to the above mode (15), once the speed control of the scanner motor is changed from the second speed control using the second periodic signal into the first speed control using the first periodic signal, the processing of identifying at least one failed element of the instant apparatus is avoided during a predetermined period following a point of time at which the speed control was changed from the first into the second speed control. As a result, during the predetermined period, the fault diagnosis by the controller is not performed even if the first periodic signal shows an abnormality.

Therefore, the apparatus according to the above mode (15) prevents the controller from performing the fault diagnosis inappropriately based on the first periodic signal which might have an abnormality not caused due to fault in the instant apparatus.

(16) The apparatus according to any one of modes (1)-(15), wherein the controller determines the pre-selected signal to be abnormal, in an absence of continuous detection of the pre-selected signal during a predetermined period.

In the apparatus according to the above mode (16), if the pre-selected signal shows an abnormality that, for example, the pre-selected signal is transitorily and instantaneously undetected, which is caused not due to fault in the instant apparatus, but due to noise, vibration, or the like, then such an abnormality of the pre-selected signal fails to trigger the fault diagnosis to be performed by the controller.

Therefore, the apparatus according to the above mode (16) prevents the controller from performing an incorrect fault diagnosis, resulting in improvement in reliability of the actual fault disgnosis.

(17) The apparatus according to any one of modes (1)-(16), wherein the controller comprises:

a control circuit adapted to allow input and output of digital signals for performing digital processing; and a motor driving circuit driving the scanner motor based on the digital signals inputted from the control circuit, wherein the control circuit produces a speed control signal based on at least one of the first and the second periodic signal and delivers the speed control signal to the motor driving circuit, to thereby control the rotational speed of the scanner motor based on the first and the second periodic signal, and wherein the motor driving circuit drives the scanner motor depending on the speed control signal.

The apparatus according to the above mode (17) makes it easier to provide a function of controlling the speed of the scanner motor based on the first and second periodic signals, and a function of identifying a fault or faults in the instant apparatus once caused, in a structurally simplified and costly saving manner.

(18) The apparatus according to any one of modes (1)-(17), wherein the second-periodic-signal generator magnetically detects the rotation of the scanner motor.

The apparatus according to the above mode (18) makes it easier to simplify the construction allowing the second periodic-signal generator to detect the rotation of the scanner motor.

(19) The apparatus according to mode (18), wherein the second-periodic-signal generator comprises at least one of a coil and a Hall element each detecting the rotation of the scanner motor.

The apparatus according to the above mode (19) provides an example of a specified arrangement of the "second periodic-signal generator" set forth in the above mode (18).

(20) A method of controlling an apparatus for forming an image, the apparatus including:

a scanner motor rotatably driving a polygon mirror for optical scan;

a laser light emitter emitting laser light toward the polygon mirror;

a first-periodic-signal generator detecting the laser light reflected off from the polygon mirror, thereby generating a first periodic signal dependent on a scanning period of the laser light; and a second-periodic-signal generator detecting directly or indirectly rotation of the scanner motor, thereby generating a second periodic signal dependent on a rotational speed of the polygon mirror, the method comprising:

a speed control step of performing speed control of the scanner motor, based on at least one of the first periodic signal generated from the first-periodic-signal generator, and the second periodic signal generated from the second-periodic-signal generator;

a first determination step of making a first determination as to whether or not a pre-selected one of the first and the second periodic signal is abnormal;

a second determination step of, upon the pre-selected signal being determined to be abnormal, making a second determination as to whether or not a remaining one of the first and the second periodic signal is normal; and a failed element identification step of identifying at least one failed element of the apparatus, based on a result of the second determination step.

The method according to the above mode (20) provides basically the same functions and effects as the apparatus according to the above mode (1), according to basically the same principle as that of the apparatus.

(21) The method according to mode (20), wherein the speed control step is effected to selectively implement first speed control allowing the rotational speed of the scanner motor to be controlled based on the first periodic signal, and second speed control allowing the rotational speed of the scanner motor to be controlled based on the second periodic signal, wherein the pre-selected signal is the first periodic signal, while the remaining signal is the second periodic signal, wherein the first determination step is effected to make a determination as to whether or not the first periodic signal is abnormal during implementation of the first speed control, as the first determination, wherein the speed control step is effected, upon the first periodic signal being determined to be abnormal, to implement the second speed control instead of the first speed control, wherein the second determination step is effected, during implementation of the second speed control, to make a determination as to whether or not the second periodic signal is normal, as the second determination, and wherein the failed element identification step is effected to identify the at least one failed element, based on a result of the second determination.

The method according to the above mode (21) provides basically the same functions and effects as the apparatus according to the above mode (6), according to basically the same principle as that of the apparatus.

Several presently preferred embodiments of the invention will be described in detail by reference to the drawings in which like numerals are used to indicate like elements throughout.

Figure 2:
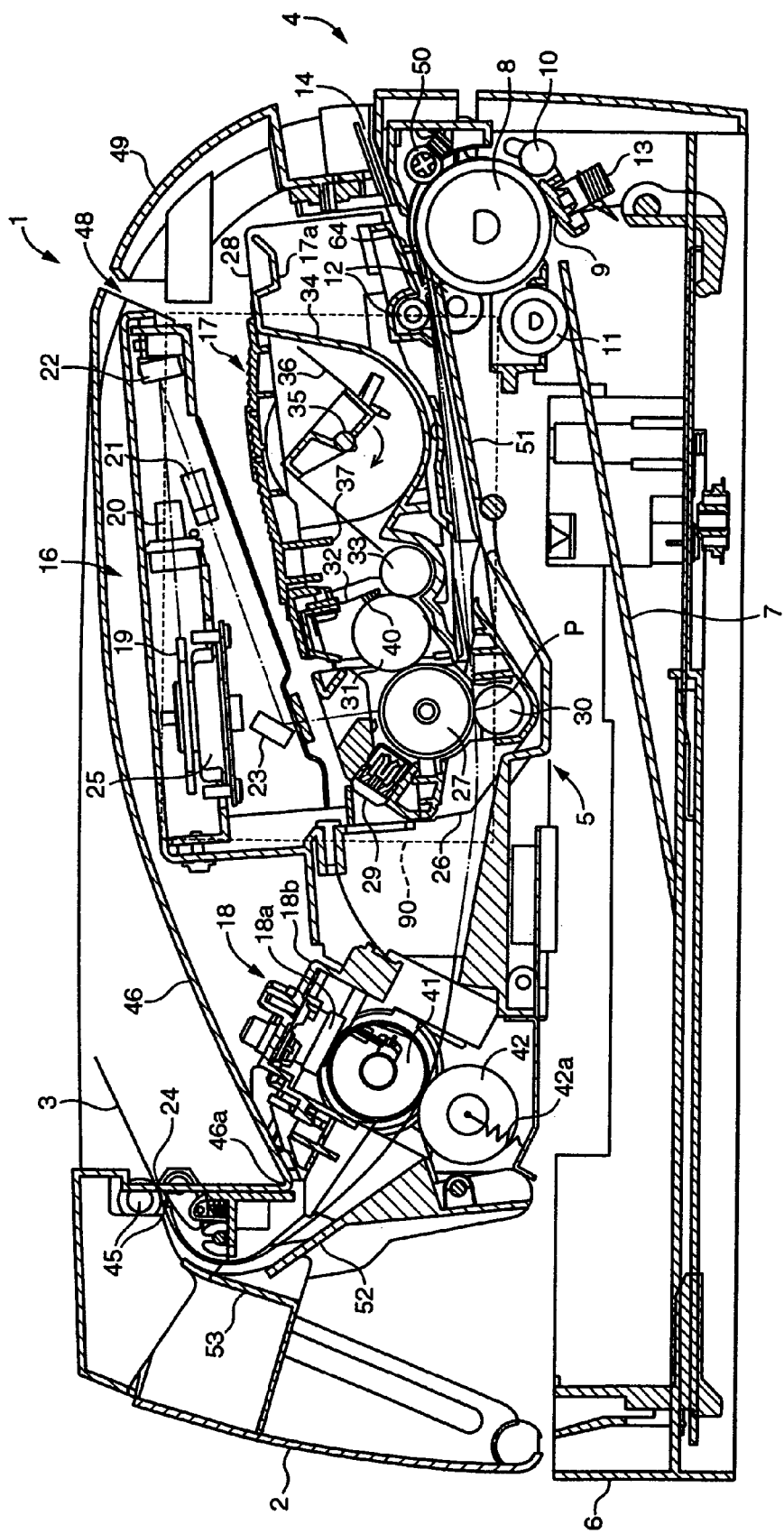
FIG. 2 is a sectional side view schematically illustrating the laser printer illustrated in FIG. 1.

Referring now to FIGS. 1 and 2, a laser printer (hereinafter, also referred to simply as "printer") 1 as an example of an image forming apparatus according to an embodiment of the present invention will be first described for understanding the entire constitution of the printer 1.

FIG. 1 is a perspective view exemplifying the printer 1. FIG. 2 is a sectional side view showing the relevant portion of the printer 1, which is taken in the axial direction of each of various rollers provided to the printer 1. In the foregoing description, the right-hand side of FIG. 2 will be referred to as "front side," and the left-hand side as "rear side."

As illustrated in FIG. 1, the printer 1 includes a body casing 2 which incorporates therein, as illustrated in FIG. 2, a feeder section 4 for feeding a sheet 3 of paper, an image forming section 5 for forming an image on the sheet 3 of paper, etc. As illustrated in FIGS. 1 and 2, the printer 1 includes on its top face a sheet exit tray 46 for storage of sheets 3 of paper which have been image-formed by and ejected from the printer 1.

On one of the side walls of the body casing 2, there are provided an opening 48 allowing a process unit 17 described below to be attached to or detached from the printer 1, and a front cover 49 allowing the opening 48 to become open or closed.

The front cover 49 is pivotally supported at a cover pivot shaft (not shown) laterally penetrating through the front cover 49 at its lower end. Because of this arrangement, a closing (folding) motion of the front cover 49 about the axis of the cover pivot shaft causes the opening 48 to become closed with the front cover 49 as illustrated in FIGS. 1 and 2, while an opening (unfolding) motion of the front cover 49 about the axis of the cover pivot shaft causes the opening 48 to become open. In this open state, the attachment or detachment of the process unit 17 can be performed through the opening 48.

As illustrated in FIG. 2, the feeder section 4 includes: a feeder tray 6, a sheet pressure plate 7 disposed within the feeder tray 6, and a delivery roller 11; a feed roller 8; and a separation pad 9; the last three of which are disposed above one of longitudinally spaced-apart both ends of the feeder tray 6. The feeder section 4 further includes: a pinch roller 10 opposed to the feed roller 8, a paper-particle collection roller 50, and a pair of registration rollers 12, 12 disposed downstream of the paper-particle collection roller 50 in the traveling direction of a sheet 3 of paper.

Specifically, as illustrated in FIG. 2, the feeder tray 6, which is detachably mounted in the bottom portion of the body casing 2, is for use in accommodating therein a stack of sheets 3 of paper. The feeder tray 6 is drawn out from the body casing 2 to the front side of the printer 1 (i.e., the right-hand side of FIG. 2) to allow replenishment of the feeder tray 6 with fresh sheets 3 of paper. The drawing movement of the feeder tray 6 causes disassembly of the feeder section 4 so as to separate the feed roller 8 and the separation pad 9 away from each other, and causes the pinch roller 10, the separation pad 9, and a spring 13 disposed under the separation pad 9 to be drawn out from the body casing 2 integrally with the feeder tray 6.

As illustrated in FIG. 2, the sheet pressure plate 7, because of its pivotal support at its distal end away from the feed roller 8, allows a vertical movement thereof at its proximal end to the feed roller 8. The sheet pressure plate 7 is biased upwardly with a spring (not shown). As a result, as sheets 3 of paper stacked on the sheet pressure plate 7 increase in amount, the sheet pressure plate 7 is pivoted downwardly about its distal end away from the feed roller 8, against a biasing force of the spring.

As illustrated in FIG. 2, the delivery roller 11, which is so configured as to be in contact with the uppermost one of sheets 3 of paper stacked on the sheet pressure plate 7, by means of the feeder tray 6, feeds the sheet 3 of paper to a position allowing the feed roller 8 to transport the sheet 3 of paper (i.e., the position between the feed roller 8 and the separation pad 9).

As illustrated in FIG. 2, the separation pad 9 is disposed in opposing relationship to the feed roller 8. The separation pad 9 is pressed against the feed roller 8 by means of the spring 13 disposed below the separation pad 9. The separation pad 9 provides a function of preventing multi sheets 3 of paper in superposed relationship from being fed into a sheet travel path.

Specifically, a sheet 3 of paper is delivered by the delivery roller 11 into contact with both the feed roller 8 and the separation pad 9 with an adequate friction force acting between the sheet 3 of paper and the separation pad 9. Therefore, even though multi sheets 3 of paper are fed together into the separation pad 9 by means of the delivery roller 11, the sheets 3 of paper except one of them are trapped by the separation pad 9, resulting in the feed of a single sheet 3 from the feed roller 8 at a time.

A sheet 3 of paper, upon being fed by the feed roller 8, is subsequently delivered to the sheet travel path which is illustrated in dash-dot-dot lines in FIG. 2. During the advancement of the sheet 3 of paper along the sheet travel path, paper particles residing on the sheet 3 of paper are removed by the paper-particle collection roller 50. Thereafter, the sheet 3 of paper is delivered to the registration rollers 12, 12.

The sheet travel path includes a main path which extends from the feed roller 8 to an image forming position "P" indicated in FIG. 2, such that the main path slopes downwardly from a horizontal direction when going downstream along the main path. The main path between the feed roller 8 and the image forming position "P" is formed with a guide member 51 formed on a body side of the printer 1, and the bottom of the process unit 17.

As illustrated in FIG. 2, the feed roller 8 allows a sheet 3 of paper to make an about 180-degree turn and then to enter the registration rollers 12, 12. In this regard, if the curvature with which the sheet 3 is bent is large, provided that the sheet 3 is as thick as a postcard, then the possibility arises that the sheet 3 is plastically bent, or fails to be delivered to the registration rollers 12, 12 in dependence upon the magnitude of a resistance of the sheet 3 against bending.

For eliminating such a possibility, the diameter of the feed roller 8 is set to be larger than those of any other rollers included in the printer 1, such as a photosensitive drum 27, and a heat roller 41. For example, the diameter of the feed roller 8 is set to 33 mm, while the diameters of the photosensitive drum 27 and the heat roller 41 are set to 24 mm and 25 mm, respectively. The setting of the diameter of the feed roller 8 to a relatively large one for a reduction in the curvature of a sheet 3 when bent allows the feed roller 8 to feed the sheet 3 so suitably that the sheet 3 is not excessively curved.

As illustrated in FIG. 2, the registration rollers 12, 12, in the form of as a pair of rollers, are controlled by the direction of a controller (not shown) disposed within a circuit board 90 described below, with respect to the drive and the deactivation of the registration rollers 12, 12 The control of the registration rollers 12, 12 is based on a detection timing provided by a position sensor 64 disposed in the vicinity of the feed roller 8 and in front of the registration rollers 12, 12. This control corrects a skewing advancement of a sheet 3 of paper.

Specifically, the controller drives the registration rollers 12, 12 during the feed of a sheet 3 of paper by the feed roller 8, and deactivates the registration rollers 12, 12, upon detection by the position sensor 64 of the leading end of the sheet 3 of paper. When a sheet 3 of paper is brought into contact with the registration rollers 12, 12 and then becomes slack, the controller drives again the registration rollers 12, 12 for the delivery of the sheet 3 of paper to the image forming section 5.

The position sensor 64 is of a mechanical type in which the position sensor 64, once brought into pressing contact with a sheet 3 of paper, is displaced from a predetermined position at which the position sensor 64 is located before its motion for contacting the sheet 3 of paper.

Slightly above the feed roller 8, there is formed an opening 14 for use in manual sheet feed which allows a direct feed of a sheet 3 of paper from the front side of the printer 1 to the position of the pair of registration rollers 12, 12, which enables a sheet 3 of paper to be supplied to the sheet travel path without requiring the sheet 3 to be loaded in the feeder tray 6.

As illustrated in FIG. 2, the image forming section 5 includes a scanner unit 16, the process unit 17, a fuser unit 18, etc.

The scanner unit 16, disposed at the upper portion of the body casing 2, includes: a laser diode 101 (not shown in FIG. 2, but shown in FIG. 3) functioning as a laser light emitter; a polygon mirror 19 rotatably driven by a scanner motor 25; lenses 20 and 21; reflective mirrors 22 and 23, etc. As illustrated in dot-dash lines in FIG. 2, the scanner unit 16 causes a laser beam which is based on image data and which is emitted from the laser diode 101, to pass through or to reflect off from the polygon mirror 19, the lens 20, the reflective mirror 22, the lens 21, and the reflective mirror 23 in the description order, thereby scanning at a higher speed the surface of the photosensitive drum 27 included in the process unit 17 described below.

More specifically, in the scanner unit 16, the polygon mirror 19 is disposed right above the photosensitive drum 27 and the image forming position "P." The laser beam reflected off from the polygon mirror 19 travels generally horizontally toward the reflective mirror 22. The laser beam is reflected off from the reflective mirror 22, upon entry thereinto, toward the reflective mirror 23 disposed immediately below the polygon mirror 19. That is to say, the reflective mirror 22 causes its incident laser beam to reflect off downwardly at an acute angle of about 15 degrees to the horizontal direction.

The scanner unit 16 including the polygon mirror 19, the lenses 20, 21, and the reflective mirrors 22, 23 described above is sized and shaped not to interfere with the optical path of the laser beam. Specifically, the top face (top plate) of the scanner unit 16 extends generally horizontally (precisely, the top face slopes downwards when going away from the feed roller 8). On the other hand, the bottom face (bottom plate) of the scanner unit 16 slopes downwards when going away from the feed roller 8 with a slope greater than that of the top face. As a result, the scanner unit 16 is convergently tapered such that its thickness (vertical dimension) is greater on the side of the image formation position "P" where the polygon mirror 19 is located, while it is less on the side where the feed roller 8 is located.

As illustrated in FIG. 2, the process unit 17, disposed below the scanner unit 16, is mounted on the body casing 2 detachably in an attachment and detachment direction generally equal to a horizontal and rearward-and-forward direction relative to the body casing 2 (the attachment and detachment direction is the right-and-left direction in FIG. 2). The process unit 17 is comprised of a drum cartridge 26 and a developer cartridge 28. A space is left between the process unit 17 and the scanner unit 16.

The drum cartridge 26 of the process unit 17 includes: the photosensitive drum 27; a scorotron-type charger 29; and a transfer roller 30, while the developer cartridge 28 includes: a developer roller 31; a thickness-regulating blade 32; a toner supply roller 33; a toner box 34; etc. The developer cartridge 28 is detachably mounted on the drum cartridge 26.

The photosensitive drum 27 and the toner box 34 take up a relatively large space or room as compared with other components of the process unit 17. Therefore, the photosensitive drum 27 and the toner box 34 are so disposed as to be deviated from a position right above the feed roller 8 and the registration rollers 12, 12, both of which are disposed in the vicinity of the process unit 17, and which take up a relatively large space or room.

As illustrated in FIG. 2, the toner box 34 is filled with toner (developer). An agitator 38 is supported on a rotating shaft 35 centrally disposed in the toner box 34. The agitator 38 is rotated in the direction indicated by the arrow (a clockwise direction), thereby agitating toner in the toner box 34 and then delivering the toner through a toner supply hole 37 disposed in the toner box 34.

As illustrated in FIG. 2, adjacent to the outside of the toner supply hole 37, the toner supply roller 33 is disposed rotatably in a counterclockwise direction. In opposing relationship to the toner supply roller 33, the developer roller 31 is disposed rotatably in a counterclockwise direction. The developer roller 31 and the toner supply roller 33 are in contact with each other with these being each compressed to a degree.

The toner supply roller 33 is constructed by covering a metal roller shaft with a roller element made up of an electro-conductive foam material. The developer roller 31 is constructed by covering a metal roller shaft with a roller element made up of a non-magnetic electro-conductive rubber material. Specifically, the roller element of the developer roller 31 is constructed by coating the surface of a roller body made up of an electro-conductive urethane rubber or silicone rubber containing carbon particles, etc., with a coating layer made up of an urethane rubber or silicone rubber containing fluorine. In development operation, a development bias is applied to the developer roller 31.

As illustrated in FIG. 2, the thickness-regulating blade 32 is disposed in the vicinity of the developer roller 31. The thickness-regulating blade 32 includes a blade body made up of a metal plate-like spring material, and a pressing member 40, which is disposed at the top of the blade body, which is made up of insulating silicone rubber, and which is generally semicircular in section. The thickness-regulating blade 32, which is supported by the developer cartridge 28 in the vicinity of the developer roller 31, is constructed such that the pressing member 40 is in pressure contact with the developer roller 31 owing to an elastic force of the blade body.

The toner, upon leaving the toner box 34 through the toner supply hole 37, is delivered to the developer roller 31 because of the rotation of the toner supply roller 33. At this stage, the toner is then positively charged by friction between the toner supply roller 33 and the developer roller 31. The toner, upon delivery to the developer roller 31, enters between the pressing member 40 of the thickness-regulating blade 32 and the developer roller 31 because of the rotation of the developer roller 31, and is additionally sufficiently charged by friction to form a thin layer having a uniform thickness carried on the developer roller 31.

As illustrated in FIG. 2, adjacent to the developer roller 31, the photosensitive drum 27 is disposed in opposing relationship to the developer roller 31 and rotatably in a counterclockwise direction. The photosensitive drum 27 is configured to include a drum body electrically grounded, and a surface area formed of a positively charged photosensitive layer made of a material such as polycarbonate. The photosensitive drum 27 is driven for rotation due to a driving force supplied from a main motor 118 described below.

As illustrated in FIG. 2, the scorotron-type charger 29 is spaced a predetermined distance apart from the photosensitive drum 27 in non-contact therewith. The scorotron-type charger 29 is disposed at a position rotated coaxially with the photosensitive drum 27 from the horizontal direction about 30 degrees upwardly. The scorotron-type charger 29 is of a scorotron type for positive charging which causes a corona discharge to occur at a charging wire made up of a material such as tungsten, and is configured so as to positively and uniformly charge the surface of the photosensitive drum 27.

In operation, the surface of the photosensitive drum 27 firstly undergoes uniform and positive charge by means of the scorotron-type charger 29 with the photosensitive drum 27 rotating. The surface of the photosensitive drum 27 is subsequently exposed to the laser beam emitted from the scanner unit 16 because of a high-speed scanning of the laser beam, to thereby form an electrostatic latent image on the surface of the photosensitive drum 27 reflecting image data which desired to be reproduced on a sheet 3 of paper.

Thereafter, once the rotation of the developer roller 31 brings the toner positively charged and carried on the developer roller 31, into contact with the photosensitive drum 27 in opposing relationship thereto, the toner is delivered onto an electrostatic latent image formed on the surface of the photosensitive drum 27. That is to say, the toner is delivered onto the surface of the photosensitive drum 27 previously uniformly and positively charged throughout in an exposed area thereof which has been exposed to the laser beam and accordingly which has been reduced in potential. Thus, the toner is selectively carried on the surface of the photosensitive drum 27 for each position on the surface, thereby visualizing the electrostatic latent image on the photosensitive drum 27, resulting in an achievement of a reverse development.

The transfer roller 30, which is disposed below the photosensitive drum 27 in opposing relationship thereto, is supported by the drum cartridge 26 rotatably in a counterclockwise direction. The transfer roller 30, which is constructed by covering a metal roller shaft with a roller element made up of an ion-conductive rubber material, is applied a transfer bias (a regular transfer bias) during a transfer operation. As a result, a visible image carried on the surface of the photosensitive drum 27 is transferred onto a sheet 3 of paper while the sheet 3 is passing through the image formation position "P" between the photosensitive drum 27 and the transfer roller 30.

The fuser unit 18, which is disposed on the downstream side of the process unit 17 as viewed in the sheet traveling direction (the rear side), includes: a heat roller 41 equipped with one or more gears; a pressure roller 42 for pressing the heat roller 41; and a thermostat 18*a*. The heat roller 41 and the thermostat 18*a* are enclosed with a cover 18*b*.

The heat roller 41, made up of a metal, includes a halogen lump for heating. A spring 42*a* is disposed at the lower portion of the pressure roller 42 for pressing (biasing) the pressure roller 42 in a direction away from the bottom and toward the central axis of the heat roller 41, while allowing the pressure roller 42 to be rotatable. The pressure roller 42 is so configured as to rotate in sync with the heat roller 41 in close contact with the heat roller 41 or a sheet 3 of paper.

The thermostat 18*a* primarily in the form of a bimetal, for example, activates or deactivates a heater (not shown) for heating the heat roller 41, depending on the amount of heat generated by the heat roller 41, thereby preventing the heat roller 41 from being overheated.

The thermostat 18*a* is disposed above the heat roller 41 along a plane including the rotational center lines of the pressure roller 42 and the heat roller 41. The plane is inclined toward the front side of the printer 1 relative to a vertical plane. This arrangement makes it easier to configure the printer 1 such that a recessed portion 46*a* of the sheet exit tray 46 is disposed at a lowered position as compared with when the thermostat 18*a* is alternatively disposed right over the heat roller 41, and when the thermostat 18*a* is alternatively disposed above the heat roller 41 and on the rear side relative to a position right over the heat roller 41 (the left-hand side of FIG. 2, i.e., the downstream side as viewed in the traveling direction of a sheet 3 of paper).

The cover 18*b* is shaped to surround the heat roller 41 at its lateral sides and top side, so as to prevent the heat generated by the heat roller 41 from escaping from the inside to the outside of the fuser unit 18 and adversely affecting other devices within the body casing 2 (for example, the scanner unit 16, etc.).

The cover 18*b* supports the pressure roller 42 at its center shaft (not shown) in a manner that the pressure roller 42 is movable in the biasing direction of the spring 42*a* and rotatable. The cover 18*b* does not cover the pressure roller 42 at its lower half portion, resulting in the lower half portion being exposed at the underside of the cover 18*b*. Therefore, the printer 1 is configured to be less in height by a dimension worth of the thickness of the cover 18*b*, than when the cover 18*b* is alternatively configured to cover the pressure roller 42 at its underside.

In the thus-constructed fuser unit 18, the heat roller 41 fuses onto a sheet 3 of paper the toner which has been previously transferred onto the sheet 3 in the process unit 17, by application of heat and pressure to the sheet 3 during its passing through between the heat roller 41 and the pressure roller 42. Further, the heat roller 41 feeds an image-fused sheet 3 of paper into a pair of sheet exit rollers 45, 45, via a sheet exit path formed with guide members 52, 53. The sheet exit rollers 45, 45 eject the fed sheet 3 of paper onto the sheet exit tray 46. The pair of sheet exit rollers 45, 45 functions as a sheet exit 24 for allowing a sheet 3 of paper to exit.

If a sheet 3 of paper is caused to be bent steeply under heat generated by the heat roller 41, then the sheet 3 is likely not to be recovered from a bent state to an unbent original state. Therefore, the guide members 52, 53, which are adapted to be brought into contact with a sheet 3 of paper upon its passing through the heat roller 41, are so configured as to cause a sheet 3 of paper, upon its passing through the heat roller 41 under heat, to be bent gently, and subsequently to be bent steeply until the sheet 3 reaches the sheet exit rollers 45, 45.

This configuration enables the sheet exit 24 to be placed at a lowered position as compared with when the sheet exit path is alternatively configured to be curved gently, resulting in an easier reduction in height of the printer 1 while preventing a permanent warp of a sheet 3 of paper from occurring.

The sheet exit tray 46 is so shaped as to be gradually lowered when going from the front side toward the rear side of the printer 1 (i.e., the left-hand side of FIG. 2). The sheet exit tray 46 is configured such that its lowest portion (the recessed portion 46a) is below the upper end of the fuser unit 18. This configuration allows the exit rollers 45, 45 to be placed at a lowered position, without requiring a reduction in the number of sheets 3 of paper stackable on the sheet exit tray 46. For this reason, the printer 1 can be designed so as to reduce the difference in height between the position of the scanner unit 16 and the position of the sheet exit rollers 45, 45, resulting in an improvement in the design flexibility (i.e., the aesthetic appearance) of the printer 1.

In the printer 1, as illustrated in broken lines in FIG. 2, the circuit board 90 on which the controller for performing drive control of the aforementioned various rollers, the polygon mirror 19, etc., are mounted is disposed on at least one of both lateral sides of the sheet travel path along which a sheet 3 of paper is transported (in the present embodiment, these sides are located as to laterally interpose the process unit 17).

Next, a motor drive device of the printer 1 operable for driving the scanner motor 25 will be described below with reference to FIGS. 3-5.

Figure 3:
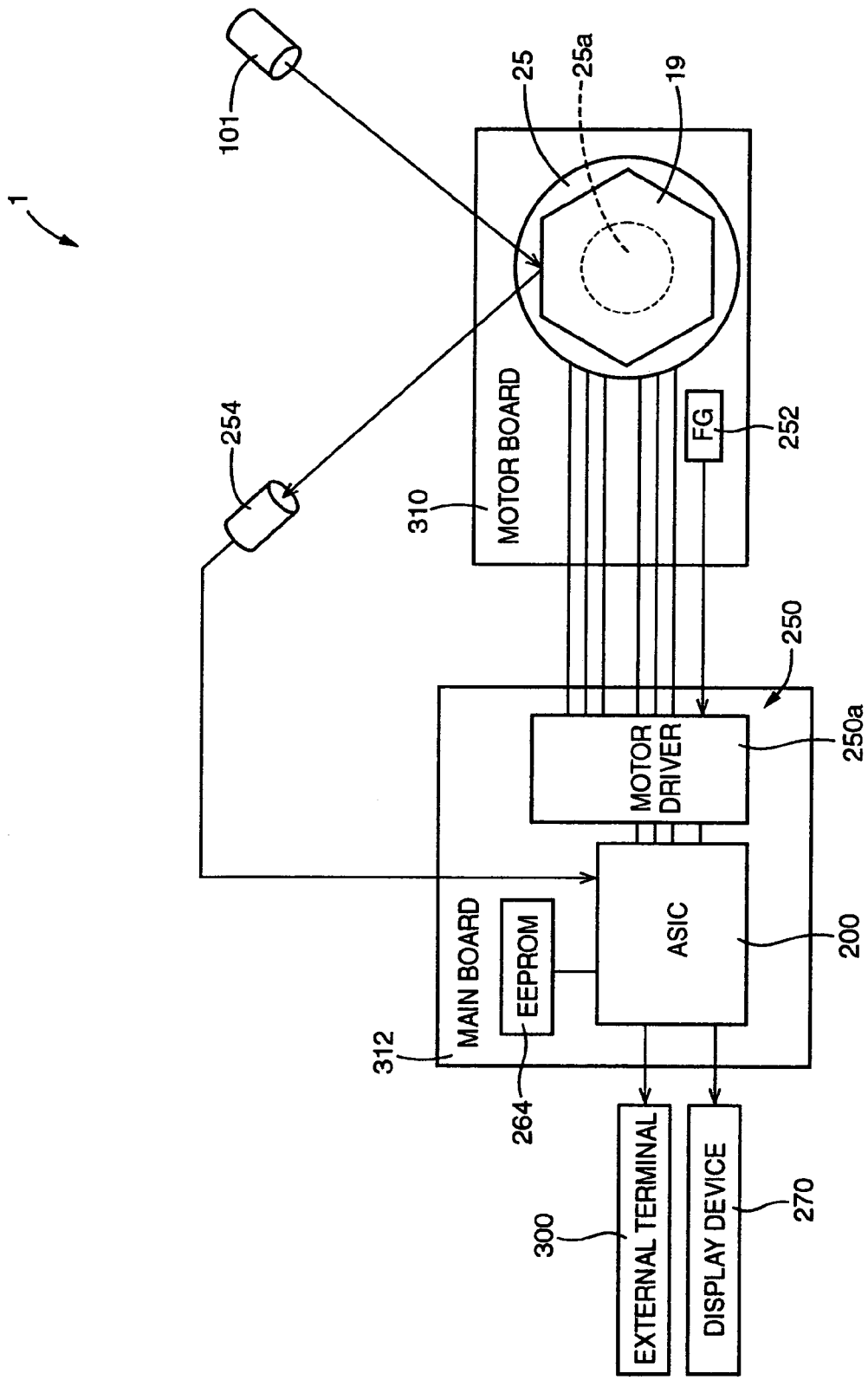
FIG. 3 schematically illustrates in block diagram a motor driving unit of the laser printer illustrated in FIG. 1, which drives a scanner motor illustrated in FIG. 2, and illustrates in top plan view the scanner motor.

FIG. 3 schematically illustrates the motor drive device in block diagram, and illustrates the scanner motor 25 together with the polygon mirror 19 in top plan view. FIG. 4 is a block diagram schematically illustrating the motor drive device of the printer 1 for driving the scanner motor 25 and also the main motor 118. FIG. 5 is a block diagram schematically illustrating a section of the motor drive device which is assigned to drive the scanner motor 25.

As illustrated in FIG. 3, the printer 1 includes: the polygon mirror 19 having a plurality of reflective surfaces; the scanner motor 25 for unidirectionally rotating the polygon mirror 19; and the laser diode 101 emitting a laser beam (an example of a laser light emitter which emits laser light). As is well known in the art, the scanner motor 25 includes a rotor 25a which rotates with the polygon mirror 19, and a stator (not shown).

The printer 1 further includes a frequency generator (hereinafter, abbreviated to "FG") 252 and a beam detector (hereinafter, abbreviated to "BD") 254.

The FG 252 detects the rotation of the rotor 25a, thereby generating an FG signal dependent on the rotational speed of the polygon mirror 19. The BD 254 detects a laser beam reflected off from the polygon mirror 19, thereby generating a BD signal dependent on the scanning period of the detected laser beam. The FG 252 and the BD 254 are common to each other in that they each function as a sensor for detecting the rotational speed of the scanner motor 25.

The FG signal output from the FG 252, and the BD signal output from the BD 254 enter an ASIC 200 to allow the ASIC 200 to implement speed control of the scanner motor 25. The ASIC 200 is so configured as to allow input/output of a digital signal and to perform digital processing.

Figure 4:
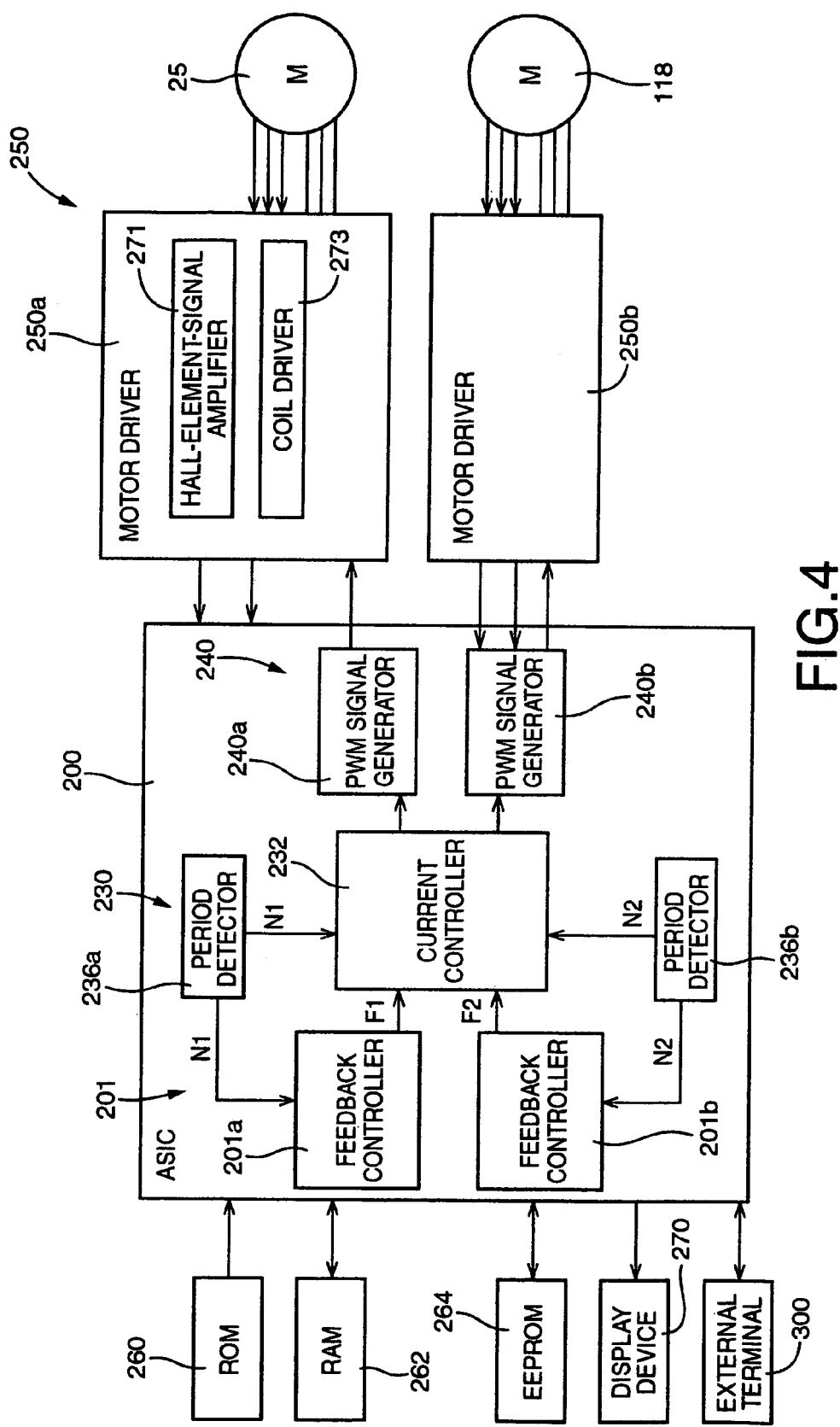
FIG. 4 is a block diagram schematically illustrating the motor driving unit of the laser printer illustrated in FIG. 1, which drives the scanner motor illustrated in FIG. 2 and a main motor.

As illustrated in FIG. 4, a motor driver 250 is electrically coupled to the ASIC 200. The motor driver 250 includes a motor driver 250a corresponding to the scanner motor 25 and a motor driver 250b corresponding to the main motor 118. In FIG. 4, the motor driver 250a corresponding to the scanner motor 25 is illustrated together with the motor driver 250b for the main motor 118, while, in FIGS. 3 and 5, the motor driver 250b for the main motor 118 is omitted in illustration.

As illustrated in FIG. 3, both the scanner motor 25 and the FG 252 are mounted on a motor board 310, while both the ASIC 200 and the motor driver 250a are mounted on a main board 312 separate from the motor board 310.

As illustrated in FIG. 4, the motor drivers 250a, 250b are so configured as to drive the scanner motor 25 and the main motor 118, respectively, based on digital signals output from the ASIC 200. There is provided inside the ASIC 200 a CPU 230 as illustrated in FIG. 5, while there are provided outside the ASIC 200, memory devices such as a ROM 260, a RAM 262, and an EEPROM 264, with the ASIC 200 being electrically coupled to the memory devices, as illustrated in FIG. 4. The ASIC 200 is also coupled to a display device 270 for visual display of information.

As illustrated in FIG. 4, the CPU 230, the ROM 260, the RAM 262, the EEPROM 264, etc., are connected to each other via buses, to thereby constitute a computer in the ASIC 200.

As illustrated in FIG. 4, period detectors 236a, 236b; feedback controllers 201a, 201b; and PWM signal generators 240a, 240b are provided to the ASIC 200 in association with the respective motors 25, 118. Hereinafter, the period detectors 236a, 236b are collectively referred to as "period detector 236," the feedback controllers 201a, 201b are collectively referred to as "feedback controller 201," and the PWM signal generators 240a, 240b are collectively referred to as "PWM signal generator 240."

Figure 5:
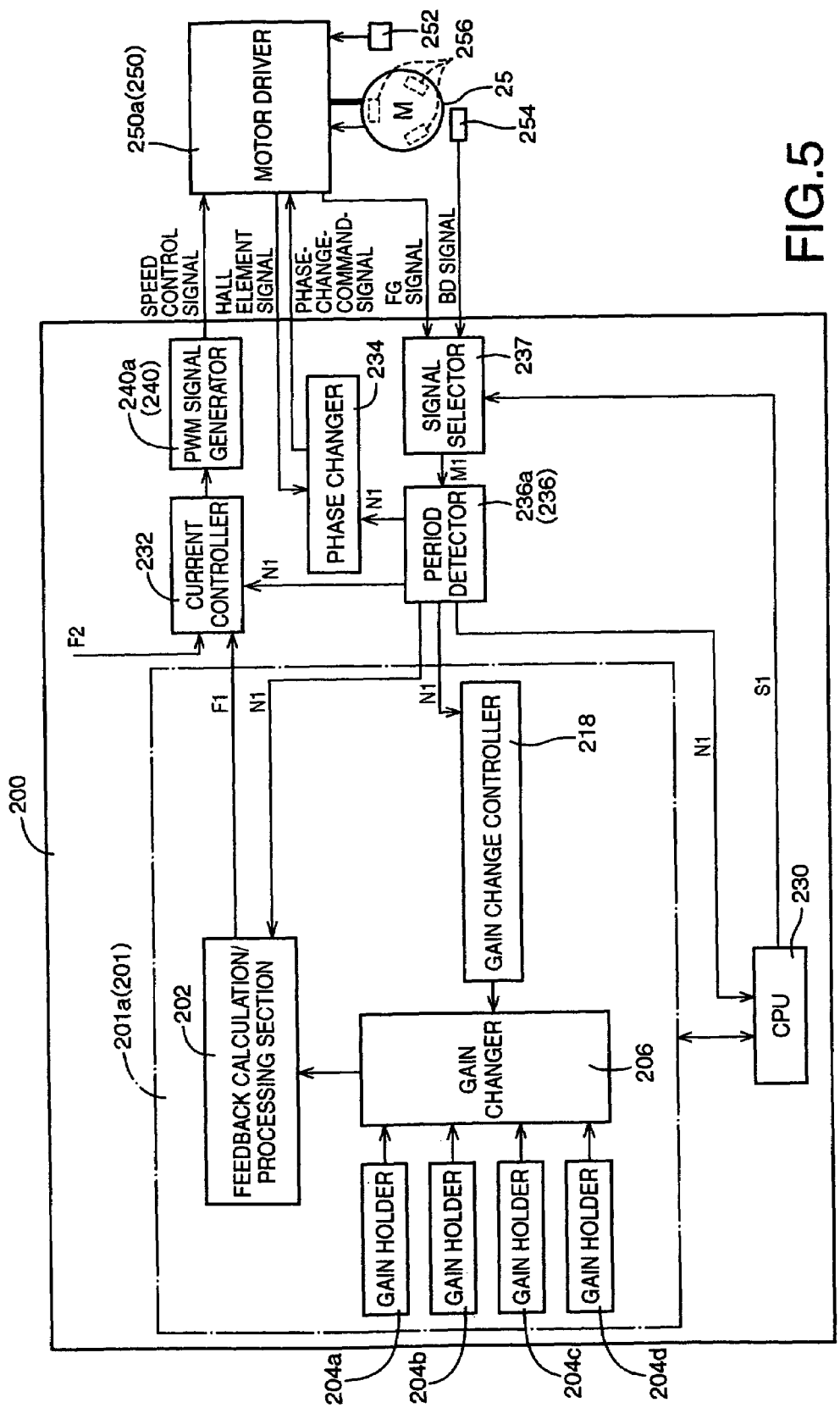
FIG. 5 is a block diagram schematically illustrating a portion of the motor driving unit illustrated in FIG. 4 which is assigned to drive the scanner motor.

FIG. 5 representatively illustrates the period detector 236a, the feedback controller 201a, the PWM signal generator 240a, a phase changer 234, etc, in correspondence with the scanner motor 25. There are similarly provided for the main motor 118 a period detector 236b (see FIG. 4), a phase changer (not shown), the feedback controller 201b (see FIG. 4), the PWM signal generator 240b (see FIG. 4), etc. As illustrated in FIG. 4, a current controller 232 as described below in more detail is provided in common to the scanner motor 25 and the main motor 118.

As illustrated in FIG. 5, the scanner motor 25 is associated with the FG 252. The period detector 236a is so configured as to detect the rotational speed of the scanner motor 25 using the FG signal (an analogue signal representative of the rotational speed or the rotation period of the polygon mirror 19) generated by the FG 252.

The FG 252, which is composed principally of a coil (not shown) patterned as an FG pattern on the motor board 310

(see FIG. 3), is so configured as to magnetically detect the rotation of the rotor 25a (see FIG. 3) of the scanner motor 25.

Specifically, the aforementioned coil and a magnet (not shown) are arranged such that one of them rotates with the rotor 25a, while the other is disposed at a stationary member (not shown) including the aforementioned stator. Because of the electromagnetic induction between the thus-arranged coil and magnet, the FG signal is generated to represent a waveform dependent on the rotational speed, namely, the rotation period of the rotor 25a (i.e., a waveform varied in frequency, amplitude, etc., with changes in the rotational speed of the rotor 25a).

As illustrated in FIG. 5, the thus-generated FG signal is entered into the motor driver 250a. The motor driver 250a is so configured as to amplify the FG signal incoming from the FG 252, and to convert the amplified signal to a digital signal. The amplified and analog-to-digital converted FG signal is output from the motor driver 250a to the ASIC 200.

As illustrated in FIG. 5, in the ASIC 200, the FG signal incoming from the motor driver 250a is entered into the period detector 236a via a signal selector 237 in a variable manner depending on the state of the signal selector 237. The period detector 236a is so configured as to detect the rotational speed of the scanner motor 25, based on the FG signal, upon reception thereof.

As illustrated in FIG. 5, the scanner motor 25 employs not only the FG 252, but also the BD 254, each functioning as a device for generating a periodic signal representative of the rotational speed of the scanner motor 25. As described above, the BD 254 detects the laser beam reflected off from the polygon mirror 19 (see FIG. 3), thereby generating the BD signal dependent on the scanning period of the detected laser beam.

The BD 254 generates the BD signal dependent on the rotation of the scanner motor 25. Specifically, as illustrated in FIG. 3, the BD 254 is located at a position allowing the BD 254 to receive light reflected off from the polygon mirror 19 each time the rotation angle of the polygon mirror 19 satisfies predetermined conditions. The BD 254 generates the BD signal varied in level depending on whether or not the BD 254 received the reflected light.

More specifically, in an example where the polygon mirror 19 has six reflective facets, as illustrated in FIG. 3, the BD 254 detects light reflected off from the polygon mirror 19 six times per a single revolution of the polygon mirror 19. A signal is output from the BD 254 which is dependent on whether or not the BD 254 received the reflected light, with the signal functioning as the BD signal representative of a waveform dependent on the rotational speed of the polygon mirror 19. The BD signal is eventually delivered to the ASIC 200.

As illustrated in FIG. 5, in the ASIC 200, the BD signal incoming from the BD 254 is entered into the period detector 236a via the signal selector 237 in a variable manner depending on the state of the signal selector 237. The period detector 236a is so configured as to detect the scanning period (the physical quantity equivalent to the rotational speed of the scanner motor 25) of the laser beam scanned by the polygon mirror 19, based on the BD signal, upon reception thereof.

It is added that, although in the present embodiment, the BD signal output from the BD 254 is entered directly into the ASIC 200, the present invention may be alternatively practiced in a manner to allow the BD signal to enter the ASIC 200 through the motor driver 250a after being digitized thereat.

As will be evident from the above description, in the present embodiment, the FG and BD signals are entered into the ASIC 200, both of which are common to each other in that they each have a function of detecting the rotational speed of the scanner motor 25. In the ASIC 200, a signal to be delivered to the period detector 236a via the signal selector 237 is changed in type between the FG and BD signals, depending on the operational state of the signal selector 237. In the ASIC 200, the speed control of the scanner motor 25 is performed based on one of the FG and BD signals which has been selected by the signal selector 237.

As illustrated in FIG. 5, a selection signal "S1" is delivered from the CPU 230 to the signal selector 237 which selects one of the FG signal and the BD signal depending on the status of the selection signal "S1." The selected signal is output from the signal selector 237 to the period detector 236a, as a signal "M1." The selection signal "S1" which is output from the CPU 230 to the signal selector 237 is varied in status depending on whether or not a selection condition as described below in detail has been met.

Upon reception of the signal "M1" from the signal selector 237, the period detector 236a detects the rotational speed of the scanner motor 25. A signal "N1" representative of the detected rotational speed is entered respectively into the phase changer 234, the current controller 232, a feedback calculation/processing section 202, a gain change controller 218, and the CPU 230. This allows the phase changer 234, the current controller 232, the feedback calculation/processing section 202, the gain change controller 218, and the CPU 230 to each monitor the rotational speed of the scanner motor 25.

As illustrated in FIG. 5, the scanner motor 25 is provided with three hall-elements 256, 256, and 256 which each generate a hall-element-signal varied dependent on the position of the rotor 25a of the scanner motor 25. Each hall-element-signal represents a waveform usable for identifying the rotational position (precisely, the relative rotational-position of the rotor 25a to the position of the aforementioned stator) of the rotor 25a of the scanner motor 25.

Upon exit from each hall-element 256, 256, 256, each hall-element-signal is entered into the motor driver 250a in which each hall-element-signal output from each hall-element 256, 256, 256 is amplified by a hall-element-signal amplifier 271 (see FIG. 4), and is then digitized with an A/D converter (not shown). The digitized hall-element-signals are delivered to the ASIC 200 which monitors the rotational position of the rotor 25a based on the hall-element-signals.

As illustrated in FIG. 5, in the ASIC 200, the phase changer 234 determines a timing of phase change of the scanner motor 25, while monitoring the position of the rotor 25a, based on the hall-element signals incoming from the motor driver 250a. At the determined timing of the phase change, the phase changer 234 outputs a phase-change-command signal in the form of a digital signal to the motor driver 250a for driving the scanner motor 25.

The scanner motor 25 in the form of a three-phase motor having U-, V-, and W-phases includes coils in a three-phase star connection. The coils are driven by a coil driver 273 of the motor driver 250a. As illustrated in FIG. 5, the three hall-elements 256, 256, 256 which are evenly spaced apart around an axis of the rotor 25a of the scanner motor 25 (at intervals of 120 degrees, for example) outputs the hall-element-signals to the ASIC 200.

The phase changer 234, once detects a predetermined one of the leading and trailing edges of the hall-element-signals, generates the phase-change-command signal to cause current to flow in the coils of the U-, V-, and W-phases of the scanner motor 25 such that the coils are excited at two of these phases in opposite in polarity to each other. The generated phase-change-command signal is output to the motor driver 250a.

As illustrated in FIGS. 4 and 5, the ASIC 200 is provided with the feedback controller 201. As illustrated in FIG. 4, the feedback controller 201 includes the feedback controller 201a associated with the scanner motor 25 and the feedback controller 201b associated with the main motor 118. The feedback controllers 201a and 201b, both of which are approximately common in construction to each other, are so composed as to calculate respective control-value signals "F1" and "F2" (indicative of the respective speed control values) for controlling the corresponding motors 25 and 118.

Now, with reference to FIG. 5, the configuration of the feedback controller 210 will be described, by way of example of the feedback controller 201a associated with the scanner motor 25.

As illustrated in FIG. 5, the feedback controller 201a includes: the feedback calculation/processing section 202; a plurality of gain holders 204a, 204b, 204c, and 204d (four gain holders, in the present embodiment); a gain changer 206; and the gain change controller 218. The gain holders 204a, 204b, 204c, and 204d hold the respective unique optional gains as described later.

Figure 6:
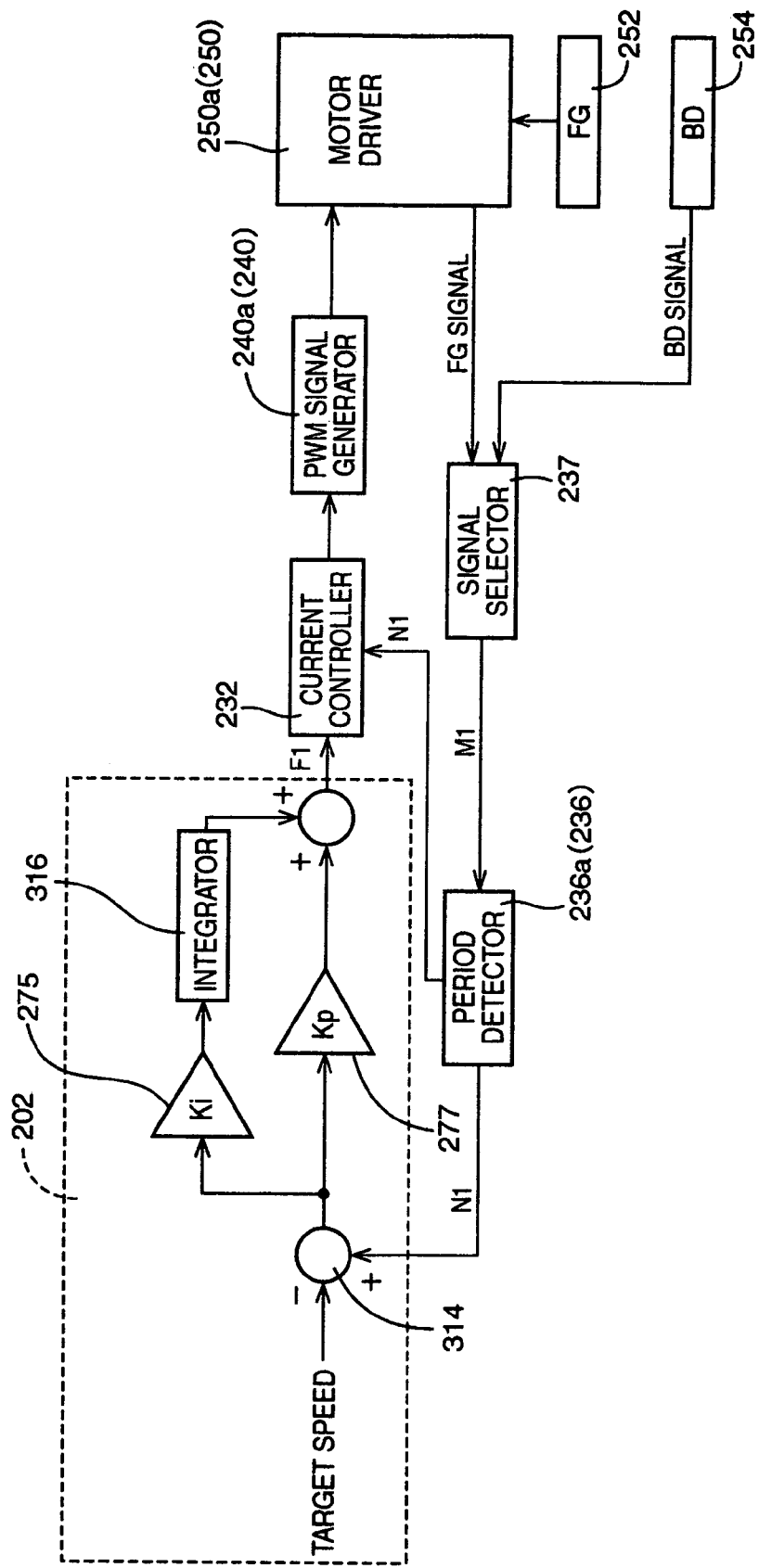
FIG. 6 is a block diagram schematically illustrating a feedback controller illustrated in FIG. 5 and the related various elements.

The feedback calculation/processing section 202, although will be described later in more detail with reference to FIG. 6, is composed so as to generate the control-value signal "F1" for operation of the scanner motor 25 using PI control based on the signal "N1" (representative of the rotational speed of the scanner motor 25) incoming from the period detector 236a, and so as to deliver the generated control-value signal "F1" to the current controller 232. As is well known in the art, the PI control includes proportional and integral actions.

To generate the control-value signal "F1," the feedback calculation/processing section 202 calculates a difference value between the detected rotational speed (rotation period) and the target rotational speed of the scanner motor 25, as a speed error. The feedback calculation/processing section 202 further calculates an integral-action control value by multiplying the speed error by an integral-action gain "Ki," and calculates a proportional-action control value by multiplying the speed error by a proportional gain "Kp." The feedback calculation/processing section 202 still further calculates the sum of the integral-action control value and the proportional-action control value, as a resultant control value (the speed command value), to thereby generate the control-value signal "F1" indicative of the resultant control value.

The integral-action gain "Ki" is varied in type depending on the operational state of the scanner motor 25. Specifically, an integral-action gain for start-up is used during start up of the scanner motor 25, while an integral-action gain for steady state is used during steady state of the scanner motor 25. These two integral-action gains are options of the integral-action gain "Ki."

Similarly, the proportional gain "Kp" is varied in type depending on the operational state of the scanner motor 25. Specifically, a proportional gain for start-up is used during start up of the scanner motor 25, while a proportional gain for steady state is used during steady state of the scanner motor 25. These two proportional gains are options of the proportional gain "Kp."

For each of the integral-action gain "Ki" and the proportional gain "Kp" to be used in the feedback calculation/processing section 202, one of the gain holders 204a, 204b, 204c, and 204d is selected by the gain changer 206, and the selected gain holder delivers its gain to the feedback calculation/processing section 202 via the gain changer 206.

The gain holders 204a, 204b, 204c, and 204d hold the respective unique set values of the integral-action gain "Ki" or the proportional gain "Kp," and each of the gain holders 204a, 204b, 204c, and 204d selectively outputs its unique set value to the gain changer 206, in response to an output request issued from the gain changer 206.

The gain change controller 218 monitors the operational state (i.e., start-up state, steady state, etc.) of the scanner motor 25 based on the signal "N1" (representative of the rotational speed of the scanner motor 25) incoming from the period detector 236a. Based on the monitored operational state, the gain change controller 218 produces selection commands in sequence required for causing the gain changer 206 to select a currently required one of the gain holders 204a, 204b, 204c, and 204d.

More specifically, after the scanner motor 25 starts rotating at a stationary state, namely, is activated, the gain change controller 218 produces such a selection command as to allow the integral-action gain "Ki" and proportional gain "Kp" both for start-up to be selected and to be supplied to the feedback calculation/processing section 202, until the scanner motor 25 enters a predetermined steady state. On the other hand, after the scanner motor 25 enters the predetermined steady state, the gain change controller 218 produces such a selection command as to allow the integral-action gain "Ki" and proportional gain "Kp" both for steady state to be selected and supplied to the feedback calculation/processing section 202.

In any event, the produced selection command is delivered from the gain change controller 218 to the gain changer 206, and the gain changer 206 selects one of the gain holders 204a, 204b, 204c, and 204d according to the delivered selection command.

Next, with reference to FIG. 6, the feedback calculation/processing section 202 will be described in more detail. FIG. 6 schematically illustrates in block diagram the configuration of the feedback calculation/processing section 202 and connections thereof with other components.

As described above, the feedback calculation/processing section 202 calculates the control value (speed command value) of the scanner motor 25, based on the gains selected by the gain changer 206 (in the present embodiment, the integral-action gain "Ki" and the proportional gain "Kp") and the rotational speed of the scanner motor 25 detected by the period detector 236 (the rotational speed of the scanner motor 25 calculated based on one of the BD and FD signals).

As illustrated in FIG. 6, the feedback calculation/processing section 202 includes a subtracter 314 for calculating an error or a difference value between the currently detected rotational speed of the scanner motor 25 and the target speed, as the aforementioned speed error.

The feedback calculation/processing section 202 further includes a multiplier 275 for multiplying the speed error by the integral-action gain "Ki" (for start-up or alternatively for steady state), and an integrator 316 for obtaining an integrated value of a plurality of calculations successively obtained by the multiplier 275, thereby calculating the integral-action control value. The feedback calculation/processing section 202 further includes a multiplier 277 for multiplying the speed error by the proportional gain "Kp" (for start-up or alternatively for steady state), thereby calculating the aforementioned proportional-action control value.

The feedback calculation/processing section 202 sums up the integral-action control value and the proportional-action control value to thereby obtain the aforementioned resultant control value (speed command value). The signal "F1" indicative of the calculated resultant control value (speed command value) is entered into the current controller 232.

As illustrated in FIG. 4, the current controller 232 is provided in common to the feedback controller 201a corresponding to the scanner motor 25, and the feedback controller 201b corresponding to the main motor 118. Therefore, the current controller 232 receives the signal "F1" (speed command value) from the feedback controller 201a, which has been produced in the above described manner for use in the speed control of the scanner motor 25, while receiving the signal "F2" (speed command value) from the feedback controller 201b, which has been produced in the same manner as with the signal "F1" for use in the speed control of the main motor 118.

Upon reception of these signals "F1" and "F2," the current controller 232 calculates current values "A2" and "B2," as the respective speed command values, to be supplied to the scanner motor 25 and the main motor 118, respectively, based on the corresponding respective signals "F1" and "F2". The current controller 232 calculates the current values "A2" and "B2" so that the total current value "E," the sum of the current values "A2" and "B2," may not be greater than a maximum value "D" of a current which is allowed to be supplied from a power source (not shown) of the printer 1.

More specifically, for example, the current controller 232 firstly calculates the current value "A2" based on the signal "F1" without making allowance for the current value "B2," and also calculates the current value "B2" based on the signal "F2" without making allowance for the current value "A2."

In this example, thereafter, the current controller 232, where the sum of the calculated current values "A2" and "B2" is not greater than the maximum value "D," determines these current values "A2" and "B2" as the respective final values. On the other hand, the current controller 232, where the sum of the calculated current values "A2" and "B2" is greater than the maximum value "D," corrects the original value of the current value "B2" to become less than the original value of the current value "B2" (a maximum value of a current allowed to be supplied to the main motor 118 under the current signal "F2").

Therefore, the current controller 232 allows an actual value of the current value "B2" which is actually supplied to the scanner motor 118, to be reduced to become less than the original value of the current value "B2," thereby preventing the total current consumption from exceeding the maximum value "D," where it is needed to supply more current to the scanner motor 25 for such as the reason that it is immediately after a start-up of the scanner motor 25, for example.

In the example explained above, although there is imposed on the current value "B2" a restriction depending on the total current consumption, where necessary, such a restriction may be alternatively imposed on the current value "A2," or both the current values "A2" and "B2," where necessary.

Therefore, although the current controller 232 determines the current value "A2" as the speed command value in an attempt to reflect the signal "F1" (speed command value), the determined current value "A2" does not always coincide with the signal "F1" (speed command value) because there is imposed on the current value "A2" a restriction depending on the total current consumption, where necessary. This is also applicable to the signal "F2" delivered from the feedback controller 201b.

Describing with respect to only the scanner motor 25, as illustrated in FIG. 4, the speed command value produced by the current controller 232 is then retrieved by the PWM signal generator 240a. The PWM signal generator 240a generates a PWM signal based on the speed command value. The PWM signal is generated so as to reflect the signal "F1" with a required restriction being imposed thereon by the current controller 232.

The generated PWM signal is outputted as the speed control signal (in the form of a digital signal), to the motor driver 250a which drives the scanner motor 25 based on the PWM signal.

As illustrated in FIG. 5, in the present embodiment, the ASIC 200 is configured to allow the CPU 230 to monitor the BD signal, during the speed control of the scanner motor 25 based on the BD signal. More specifically, where the BD signal outputted from the BD 254 has an abnormality, the CPU 230 is capable of detecting the abnormality in the BD signal.

Upon detection of an abnormality in the BD signal, the CPU 230 outputs the selection signal "S1" to the signal selector 237. In response to the incoming selection signal "S1," the signal selector 237 changes one of the FG and BD signals which is delivered to the period detector 236a via the signal selector 237, from the BD signal to the FG signal.

The BD signal is a signal generated by the BD 254 detecting the laser beam, wherein the laser beam is emitted from the laser diode 101 into the polygon mirror 19, and is then reflected off from the polygon mirror 19. Therefore, an abnormality in the laser diode 101 would propagate to the BD signal. Even if no abnormality exists in the laser diode 101, the BD signal becomes abnormal if an abnormality exists in the scanner motor 25 causing the polygon mirror 19 to rotate. Even if no abnormality exists in the scanner motor 25, the BD signal becomes abnormal if an abnormality exists in the BD 254.

Accordingly, information indicating that the BD signal is abnormal would allow prediction that a malfunction(s) in the printer 1 are caused due to at least one of the laser diode 101, the scanner motor 25, and the BD 254. However, additional information is required for identifying at least one of the laser diode 101, the scanner motor 25, and the BD 254 as causing the malfunction(s) in the printer 1.

For this reason, the ASIC 200 is configured such that the CPU 230 is capable of determining whether or not the FG signal is normal while the scanner motor 25 is controlled based on the FG signal.

The fact that the BD signal is abnormal but the FG signal is normal implies that neither the scanner motor 25 nor the FG 252 has failed.

Based on the above findings, where the BD signal is abnormal but the FG signal is normal, the CPU 230 determines that the laser diode 101 and/or the BD 254 are likely to be failed. On the other hand, where the FG signal is also abnormal, the CPU 230 determines that the scanner motor 25 and/or the FG 252 are likely to be failed. The CPU 230 stores such determination results in the EEPROM 264 without losing information even when the power is switched off.

The FG signal is a signal generated by the FG 252 magnetically detecting the rotational speed of the scanner motor 25. Therefore, an abnormality in the scanner motor 25 would propagate to the FG signal. Even if no abnormality exists in the scanner motor 25, the FG signal becomes abnormal if an abnormality exists in the FG 252.

Accordingly, information indicating that the FG signal is abnormal allows prediction that a malfunction(s) in the printer 1 is caused due to at least one of the scanner motor 25 and the FG 252. However, additional information is required for identifying one of the scanner motor 25 and the FG 252 as causing the malfunction(s) in the printer 1.

Figure 7:
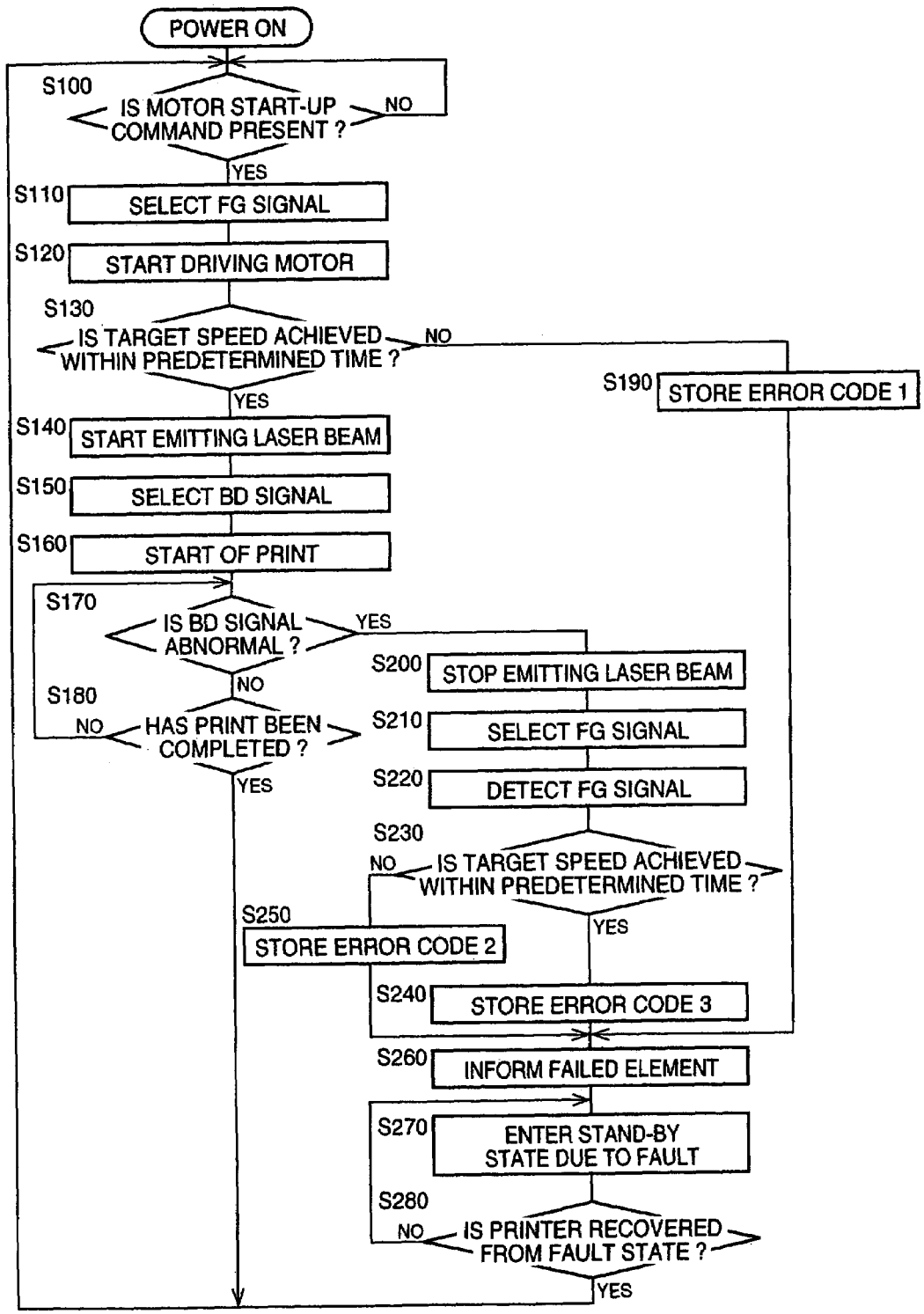
FIG. 7 is a flow chart schematically illustrating a program executed by a CPU illustrated in FIG. 5, for controlling the scanner motor illustrated in FIG. 3.

Abnormality detection processing and failed-element identifying processing (i.e., fault diagnosis) both implemented by the CPU 230, although having been outlined above, will be described in more detail with reference to FIG. 7. FIG. 7 is a flow chart schematically illustrating a program executed by the CPU 230 for performing scanner motor drive processing including those abnormality detection processing and the failed-element identifying processing.

Upon activation of the aforementioned power source of the printer 1, the program illustrated in FIG. 7 is initiated by the CPU 230. The program begins with a step S100 in which a determination is made as to whether or not a motor start-up command has been issued to the printer 1.

If the motor start-up command has not yet been issued, then the determination of the step S100 becomes negative "NO," and the step S100 is repeated. As a result, the printer 1 is held in a stand-by mode until the motor start-up command is issued. On the other hand, if the motor start-up command has been issued, the determination of the step S100 becomes affirmative "YES," and the program proceeds to a step S110.

The step S110 is implemented to set the reference signal for use in the speed control of the scanner motor 25 to the FG signal. As a result, the selection signal "S1" indicative of the setting is delivered from the CPU 230 to the signal selector 237, whereby the signal selector 237 selects the FG signal from the FG and BD signals.

Next, a step S120 is implemented to activate the scanner motor 25. The scanner motor 25 is feedback-controlled based on its rotational speed represented by the FG signal.

Figure 8:
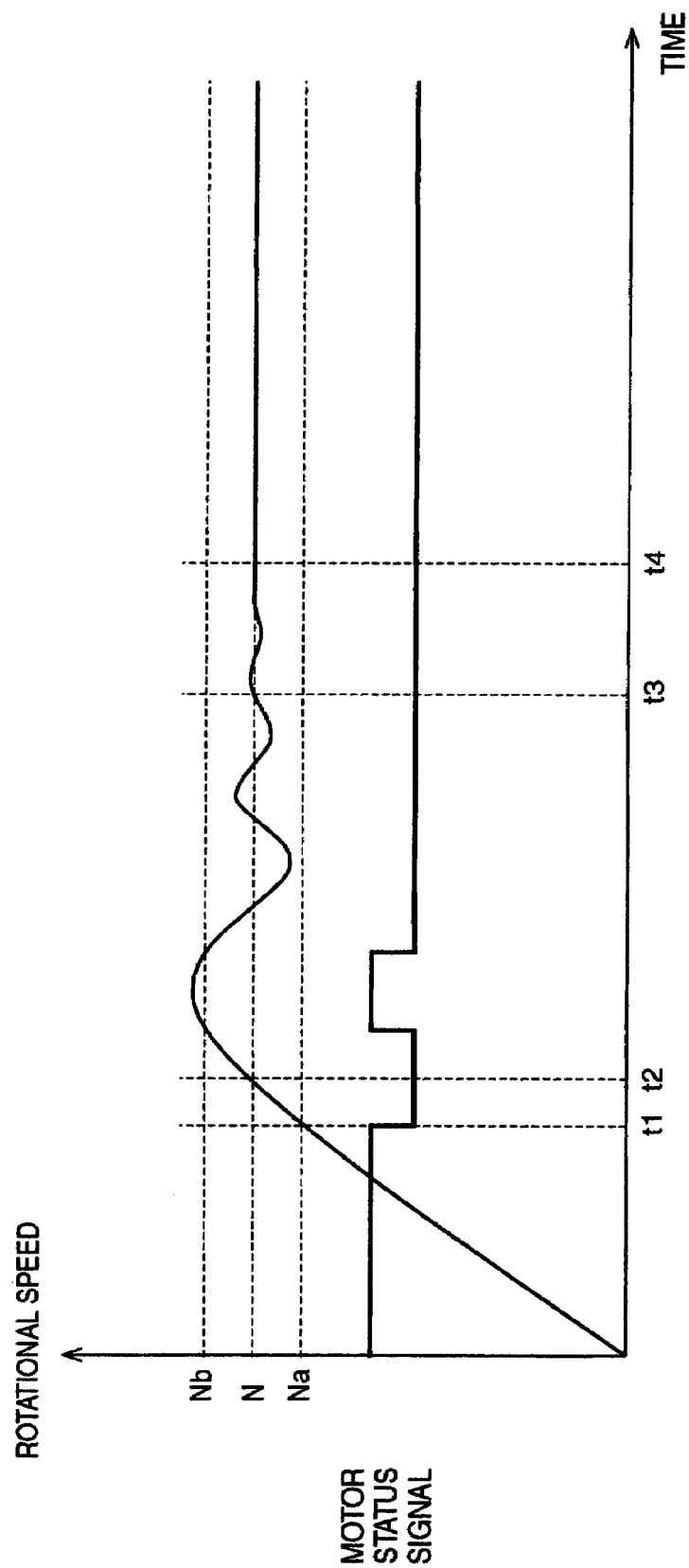
FIG. 8 is a graph illustrating an example of temporal changes in the rotational speed of the scanner motor illustrated in FIG. 3, for explanation of how the rotational speed of the scanner motor is changed with time after start-up of the scanner motor.

Thereafter, a step S130 is implemented to determine whether or not the detected rotational speed (the FG signal) of the scanner motor 25 fell into a target allowable range before a predetermined period of time "T1" (for example, five seconds) elapses since the start-up point of time of the scanner motor 25. The target allowable range is pre-defined such that a target rotational speed "N" is centered between an upper limit "Na" of rotational speed and a lower limit "Nb" of rotational speed. The step S130 provides a function of determining whether or not the FG signal is normal. FIG. 8 illustrates in graph an example of temporal changes in the rotational speed of the scanner motor 25.

In the present embodiment, as exemplarily illustrated in FIG. 8, a motor status signal is generated for use in determining whether or not the rotational speed of the scanner motor 25 fell into the target allowable range. The motor status signal is varied in level such that it is at a low level when the rotational speed of the scanner motor 25 falls within the target allowable range, while it is at a high level when the rotational speed of the scanner motor 25 does not fall within the target allowable range.

Therefore, determination as to whether or not the motor status signal changed into a low level allows determination as to whether or not the rotational speed of the scanner motor 25 fell into the target allowable range.

In the example illustrated in FIG. 8, a point of time "t4" stands for a point of time at which the predetermined time "T1" elapses since a start-up of the scanner motor 25. In this example, the rotational speed of the scanner motor 25 falls into the target allowable range before the point of time "t4" is arrived.

If the rotational speed of the scanner motor 25 did not fall into the target allowable range before the predetermined time "T1" elapses since a start-up of the scanner motor 25, then the determination of the step S130 illustrated in FIG. 7 becomes negative "NO," and a step S190 is implemented to store error code 1 in the EEPROM 264. The error code 1 indicates that the scanner motor 25 and/or the FG 252 are likely to have been failed.

As illustrated in FIG. 8, if the rotational speed of the scanner motor 25 fell into the target allowable range before the predetermined time "T1" elapses since a start-up of the scanner motor 25 (by the point of time "t4"), then the determination of the step S130 becomes affirmative "YES." Thereafter, a step S140 is implemented to cause the laser diode 101 to start emitting laser beam at a predetermined timing of start of emission.

As will be evident from the above description, in the present embodiment, the event that the rotational speed of the scanner motor 25 falls into the target allowable range before the predetermined length of time "T1" elapses since a start-up of the scanner motor 25 constitutes an example of the "condition for start of emission" set forth in the above mode (14).

In the example illustrated in FIG. 8, the rotational speed of the scanner motor 25 falls into the target allowable range at the point of time "t1." In this case, emission of the laser beam by the laser diode 101 starts at the point of time "t2."

Subsequently, a step S150 is implemented to employ an estimated timing at which the BD 254 normally receives the laser beam emitted from the laser diode 101, as the predetermined timing of start of emission (a timing at with a predetermined length of time "T2" elapses since a start of emission of the laser beam, or the point of time "t3" in the example illustrated in FIG. 8).

The step S150 is implemented to cause the CPU 230 to output to the signal selector 237, at the predetermined timing of start of emission, the selection signal "S1" for directing the signal selector 237 to change its active signal from the FG signal to the BD signal.

Further, the step S150 is then implemented to verify that the signal selector 237 normally received the BD signal. More specifically, for example, a determination is made as to whether or not the period (cycle time) of the signal "M1" outputted from the signal selector 237 to the period detector 236a is present, or alternatively a determination is made as to whether or not the period of the signal "M1" falls within in a predetermined range. In any case, if the determination is affirmative, then it is verified that the signal selector 237 normally received the BD signal.

Still further, the step S150 is implemented, upon verification of the normal reception of the BD signal, to change the speed control of the scanner motor 25 from speed control based on the FG signal to speed control based on the BD signal. Thereafter, a step S160 is implemented to start a current cycle of a print job (printing operation).

As will be evident from the above description, in the present embodiment, the event that the presence of the BD signal is verified when the predetermined length of time "T2" elapses since a start of emission of the laser beam constitutes an example of the "condition for change over" set forth in the above mode (13).

Further, in the present embodiment, the speed control of the scanner motor 25 is performed based on the FG signal during a period since a start of emission of the laser beam, until the predetermined condition for change over (for a change from the FG signal to the BD signal) is established. The condition for change over is established if normal output of the BD signal from the BD 254 is verified when the predetermined length of time "T2" elapses since a start of emission of the laser beam. Upon establishment of the condition for change over, the speed control of the scanner motor 25 is performed based on the BD signal.

More specifically, a verification is made as to whether or not the BD 254 generates normally the BD signal, when a predetermined length of time elapses since a start of emission of the laser beam by the laser diode 101. That is to say, the signal selector 237 is temporarily changed in state to verify the presence of the BD signal. After the verification, the speed control of the scanner motor 25 is changed into speed control based on the BD signal.

It is added that, as illustrated in FIG. 5, although the present embodiment employs the configuration in which the signal selector 237 selects one of the BD and FG signals and outputs it into the CPU 230, the present invention may be practiced in an alternative arrangement in which the signal selector 237 outputs the BD and FG signals together into the CPU 230 without signal selection by the signal selector 237.

This alternative arrangement may be embodied as the configuration in which the FG and BD signals, upon entry into the ASIC 200, are delivered to the CPU 230 without passing through the signal selector 237. This alternative arrangement would allow the CPU 230 to verify the presence of the BD signal without requiring any selecting operation of the signal selector 237.

Once a printing operation is initiated as a result of the implementation of the step S160, a step S170 is implemented to determine whether or not the BD signal is abnormal, during the speed control of the scanner motor 25 based on the BD signal. In the present embodiment, the BD signal is determined to be abnormal unless the BD signal was detected continuously (without interruption) for a predetermined length of time.

In the present embodiment, the step S170 is initiated after a predetermined length of time elapses since the implementation of the step S150. Therefore, the fault diagnosis of the printer 1 is delayed for the predetermined length of time since a point of time at which the speed control of the scanner motor 25 was changed from the speed control based on the FG signal into the speed control based on the BD signal, even if an abnormality arises in the BD signal.

If the BD signal is normal, then the determination of the step S170 becomes negative "NO," and a step S180 is implemented to determine whether or not the current cycle of print job has been completed. If the current cycle of print job has not yet been completed, then the determination of the step S180 becomes also negative "NO," and the program returns to the step S170.

If the current cycle of print job is completed, then the determination of the step S180 becomes affirmative "YES," and the program returns to the step S100 in which the printer 1 is placed in a stand-by mode until a subsequent motor start-up command is issued.

The loop of the steps S170 and S180 is repeated until the current cycle of print job is completed. If the determination of the step S170 becomes affirmative "YES" because the BD signal became abnormal before completion of the current cycle of print job, then the program proceeds to a step S200.

If the BD signal is abnormal, then there exist in the printer 1 at least the possibility that the scanner motor 25 has been failed and the possibility that the FG 252 has been failed. For this reason, the step S200 is implemented to terminate emission of the laser beam from the laser diode 101.

In the present embodiment, a step S230 is implemented later to determine whether or not the FG signal is normal, and, after the determination is obtained, an ultimate determination is made as to whether or not neither the scanner motor 25 nor the FG 252 has been failed.

However, in the present embodiment, prior to the ultimate determination, the step S200 is implemented to terminate emission of the laser beam from the laser diode 101, by taking account of the presence of the possibility that the scanner motor 25 and/or the FG 252 have been failed.

The step S200 is followed by a step S210 where the CPU 230 outputs the selection signal "S1" to the signal selector 237 for directing the signal selector 237 to change the reference signal for use in the speed control of the scanner motor 25 from the BD signal to the FG signal. As a result, the reference signal for use in the speed control of the scanner motor 25 is changed from the BD signal to the FG signal.

Thereafter, a step S220 is implemented to initiate the detection of the FG signal. The step S220 is followed by the step S230 where a determination is made as to whether or not the detected rotational speed (the FG signal) of the scanner motor 25 fell into the aforementioned target allowable range before a predetermined length of time "T3" elapses since the implementation of the step S220. The step S220 is implemented to determine whether or not the FG signal is normal, in the same manner as the aforementioned step S130.

If the FG signal did not become normal before the elapse of the predetermined length of time "T3," then the determination of the step S230 becomes negative "NO." Thereafter, a step S250 is implemented to store in the EEPROM 264, error code 2 indicating that the scanner motor 25 and/or the FG 252 have been failed.

On the other hand, if the FG signal became normal before the elapse of the predetermined length of time "T3," then the determination of the step S230 becomes affirmative "YES." Thereafter, a step S240 is implemented to store in the EEPROM 264, error code 3 indicating that the laser diode 101 and/or the BD 254 have been failed, although both the scanner motor 25 and the FG 252 have not been failed.

If any one of the steps S190, S240, and S250 is implemented and a corresponding of the error codes 1, 2, and 3 is stored in the EEPROM 264, then the stored error code is displayed by the display device 270. This allows the content of the error code to be presented to the user, a service technician, etc.

Thereafter, a step S270 is implemented to cause the printer 1 to enter a stand-by mode because of the occurrence of malfunction in the printer 1. Subsequently, a step S280 is implemented to determine whether or not the printer 1 has been recovered from its fault state (or error state). If the printer 1 has been recovered from the fault state, then the determination of the step S280 becomes affirmative "YES." The program then returns to the step S100 for causing the printer 1 to be placed in the stand-by mode in preparation for the next cycle of print job.

On the other had, if the printer 1 has not yet been recovered from its fault state, then the determination of the step S280 becomes negative "NO," and the program returns to the step S270. The loop of the steps S270 and S280 is repeated until the printer 1 is recovered from its fault state. Therefore, an unsuccessful recovery of the printer 1 causes the printer 1 to be continuously held in its stand-by state due to its malfunction.

As illustrated in FIGS. 3 and 4, the EEPROM 264 is connected via the ASIC 200 to an external terminal 300 connectable to an external device such as a computer. Therefore, in the present embodiment, fault-related information stored in the EEPROM 264 can be retrieved via the external terminal 300 allowing data input/output therethrough, and can be referred to at the external device.

That is to say, in the present embodiment, the display device 270 allows the fault-related information to be presented to the user or a service technician directly at the printer 1, and additionally, the external terminal 300 allows the fault-related information to be presented to the user or a service technician outside the printer 1. However, it is of course that the present invention may be practiced in an alternative arrangement in which only one of these two different presenting approaches is employed for annunciating or notifying the fault-related information.

In the present embodiment, although the external terminal 300 is in the form of a USB (Universal Serial Bus) terminal, an alternative type of terminal may be used if it only has a function of allowing information stored in the EEPROM 264, to be referred to at the external device.

In addition, in the present embodiment, the display device 270 is configured, with a plurality of LEDs, such that a particular content is visually presented by selectively blinking these LEDs or by turning on these LEDs. The operating state of these LEDs is varied depending on the selection of one of the error codes 1, 2, and 3 which is to be presented, so that the user, etc. may recognize at least one failed element of the printer 1 by viewing the display device 270.

In the present embodiment, although the display device 270 is constructed principally with LEDs, the display device 270 is not limiting and may be alternatively constructed using such as a display unit which can display characters or text.

In addition, in the present embodiment, upon detection of an abnormality in the BD signal, a print job is suspended, irrespective of whether or not a later determination is made that the FG signal is normal. The reason is that, if the BD signal has failed, then the laser diode 101 is likely to have been failed, even if the FG signal is normal.

The present invention may be practiced in an alternative arrangement constructed by adding to the present embodiment, the steps of: (a) determining whether or not the laser diode 101 is normal, by reference to a signal directly reflecting the operating state of the laser diode 101; and (b) in response to a determination that the laser diode 101 is normal and the FG signal is also normal, allowing the printer 1 to restart a printing operation by reactivating the laser diode 101.

When the above arrangement is employed, the printer 1 can be so redundantly configured as to allow the BD signal and the FG signal to be selectively used for the speed control of the scanner motor 25, any time, in an interchangeable manner, resulting in enhancement in the fault tolerance of the printer 1, throughout its printing operation.

As will be readily understood from the above, in the present embodiment, the laser diode 101 constitutes an example of the "laser light emitter" set forth in the above mode (1), the BD 254 constitutes an example of the "first periodic-signal generator" set forth in the same mode, and the FG 252 constitutes an example of the "second periodic-signal generator" set forth in the same mode.

Further, in the present embodiment, the BD signal constitutes an example of the "first periodic signal" set forth in the mode (1), and the FG signal constitutes an example of the "second periodic signal" set forth in the same mode.

Still further, in the present embodiment, the ASIC 200, the ROM 260, the RAM 262, and the EEPROM 264 together constitute an example of the "controller" set forth in the mode (1).

Yet further, in the present embodiment, a portion of the computer including the CPU 230, the ROM 260, and the RAM 262, etc., which is assigned to implement the steps S130 and S170 illustrated in FIG. 7 constitutes an example of the "abnormality detector" set forth in the above mode (2), and a portion of the computer which is assigned to implement the steps S210-S230 constitutes an example of the "failed element identifier" set forth in the same mode.

Additionally, in the present embodiment, the display device 270 cooperates with a portion of the computer which is assigned to implement the steps S190, S240, and S250 to constitute an example of the "annunciator" set forth in the above mode (3), and the EEPROM 264 constitutes an example of the "nonvolatile storage" set forth in the above mode (8).

Still additionally, in the present embodiment, the ASIC 200 constitutes an example of the "control circuit" set forth in the above mode (17), and the motor driver 250 constitutes an example of the "motor driving circuit" set forth in the same mode.

Yet additionally, in the present embodiment, the steps S110, S120, S150, and S210 illustrated in FIG. 7 together constitute an example of the "speed control step" set forth in the above mode (20), the step S170 constitutes an example of the "first determination step" set forth in the same mode, the step S230 constitutes an example of the "second determination step" set forth in the same mode, and the steps S240 and S250 together constitute an example of the "failed element identification step" set forth in the same mode.

Although a particularly preferable embodiment of the present invention has been described above, the invention is not limited to the embodiment, and may be practiced in various alternative modes as described below, for example.

Although, in the embodiment described above, the FG 252 is employed as a device, separate from the BD 254, which generates a periodic signal representative of the rotational speed of the scanner motor 25, the present invention may be practiced in a mode in which the hall elements 256 is employed instead of the FG 252. In this mode, the FG 252 may be removed.

The present invention may be also practiced in a mode in which a sensor optically reading a mark fixed to the polygon mirror 19 is employed as a device, separate from the BD 254, instead of the FG 252, which generates a periodic signal representative of the rotational speed of the scanner motor 25.

Although the above embodiment is an example in which the present invention is applied to the printer 1, the present invention may be applied to a copier, a facsimile machine, etc., because an image forming apparatus to which the present invention is applicable is enough if only it has a function of forming an image.

Although, in the embodiment described above, the laser beam emission from the laser diode 101 is terminated if once a determination is made that an abnormality exists in the BD signal, the present invention may be practiced in an alternative mode in which the termination of the laser beam emission from the laser diode 101 is delayed until at least one of the scanner motor 25 and the FG 252 is each detected as an failed element as a result of the implementation of the steps S210-S230.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for forming an image, comprising:
 a scanner motor rotatably driving a polygon mirror for optical scan;
 a laser light emitter emitting laser light toward the polygon mirror;
 a first-periodic-signal generator detecting the laser light reflected off from the polygon mirror, thereby generating a first periodic signal dependent on a scanning period of the laser light;
 a second-periodic-signal generator detecting directly or indirectly rotation of the scanner motor, thereby generating a second periodic signal dependent on a rotational speed of the polygon mirror; and
 a controller performing speed control of the scanner motor, based on at least one of the first periodic signal generated from the first-periodic-signal generator, and the second periodic signal generated from the second-periodic-signal generator,
 wherein the controller makes a first determination as to whether or not a pre-selected one of the first and the second periodic signal is abnormal,
 wherein the controller, upon the pre-selected signal being determined to be abnormal, makes a second determination as to whether or not a remaining one of the first and the second periodic signal is normal, and
 wherein the controller identifies at least one failed element of the apparatus, based on both the result of the second determination and the first determination that the pre-selected signal is abnormal.

2. The apparatus according to claim 1, wherein the controller comprises:
 an abnormality detector detecting an abnormality of each of the first and the second periodic signal; and
 a failed element identifier, upon detection of the abnormality of the pre-selected signal by the abnormality detector, making a determination as to whether or not the remaining signal is normal, as the second determination,
 wherein the failed element identifier identifies the at least one failed element, based on a result of the second determination.

3. The apparatus according to claim 1, wherein the controller comprises an annunciator informing the identified at least one failed element.

4. The apparatus according to claim 1, wherein the controller implements the speed control by selectively using the first and the second periodic signals.

5. The apparatus according to claim 4, wherein the controller selectively implements first speed control allowing the rotational speed of the scanner motor to be controlled based on the first periodic signal, and second speed control allowing the rotational speed of the scanner motor to be controlled based on the second periodic signal.

6. The apparatus according to claim 5, wherein the pre-selected signal is the first periodic signal, while the remaining signal is the second periodic signal,
 wherein the controller, during implementation of the first speed control, makes a determination as to whether or not the first periodic signal is abnormal, as the first determination,
 wherein the controller, upon the first periodic signal being determined to be abnormal, makes a determination as to whether or not the second periodic signal is normal, as the second determination, and
 wherein the controller identifies the at least one failed element, based on both the result of the second determination and the first determination that the pre-selected signal is abnormal.

7. The apparatus according to claim 1, wherein the at least one failed element is selected from the group consisting of: the scanner motor, the laser light emitter, the first-periodic-signal generator, and the second-periodic-signal generator.

8. The apparatus according to claim 1, further comprising a nonvolatile storage, wherein the controller stores in the nonvolatile storage for conservation, information of the identified at least one failed element.

9. The apparatus according to claim 1, wherein the controller makes a determination as to whether or not at least one of the scanner motor and the second periodic-signal generator has been identified as the at least one failed element, or whether or not at least one of the scanner motor and the second periodic-signal generator will be likely to be identified as the at least one failed element, and
 wherein the controller, if the determination is affirmative, deactivates the laser light emitter for terminating emission of the laser light from the laser light emitter.

10. The apparatus according to claim 1, wherein the pre-selected signal is the first periodic signal, while the remaining signal is the second periodic signal, and
 wherein the controller, upon the first periodic signal being determined to be abnormal, deactivates the laser light emitter for terminating emission of the laser light from the laser light emitter.

11. The apparatus according to claim 1, wherein the controller determines the pre-selected signal to be abnormal, in an absence of continuous detection of the pre-selected signal during a predetermined period.

12. The apparatus according to claim 1, wherein the controller comprises:
 a control circuit adapted to allow input and output of digital signals for performing digital processing; and
 a motor driving circuit driving the scanner motor based on the digital signals inputted from the control circuit,
 wherein the control circuit produces a speed control signal based on at least one of the first and the second periodic signal and delivers the speed control signal to the motor driving circuit, to thereby control the rotational speed of the scanner motor based on the first and the second periodic signal, and
 wherein the motor driving circuit drives the scanner motor depending on the speed control signal.

13. The apparatus according to claim 1, wherein the second-periodic-signal generator magnetically detects the rotation of the scanner motor.

14. The apparatus according to claim 13, wherein the second-periodic-signal generator comprises at least one of a coil and a Hall element each detecting the rotation of the scanner motor.

15. An apparatus for forming an image, comprising:
 a scanner motor rotatably driving a polygon mirror for optical scan;
 a laser light emitter emitting laser light toward the polygon mirror;
 a first-periodic-signal generator detecting the laser light reflected off from the polygon mirror, thereby generating a first periodic signal dependent on a scanning period of the laser light;

a second-periodic-signal generator detecting directly or indirectly rotation of the scanner motor, thereby generating a second periodic signal dependent on a rotational speed of the polygon mirror; and a controller performing speed control of the scanner motor, based on at least one of the first periodic signal generated from the first-periodic-signal generator, and the second periodic signal generated from the second-periodic-signal generator, wherein the controller makes a first determination as to whether or not a pre-selected one of the first and the second periodic signal is abnormal, wherein the controller, upon the pre-selected signal being determined to be abnormal, makes a second determination as to whether or not a remaining one of the first and the second periodic signal is normal, and wherein the controller identifies at least one failed element of the apparatus, based on a result of the second determination;

wherein the pre-selected signal is the first periodic signal, while the remaining signal is the second periodic signal, wherein the controller, upon the first periodic signal being determined to be abnormal, makes a determination as to whether or not the second periodic signal is normal, and wherein the controller, upon the second periodic signal being determined to be normal, identifies at least one of the laser light emitter and the first-periodic-signal generator as the at least one failed element, and wherein the controller, upon the second periodic signal being determined to be abnormal, identifies at least one of the scanner motor and the second-periodic-signal generator as the at least one failed element.

16. The apparatus according to claim 15, wherein the controller, upon the first periodic signal being determined to be abnormal, deactivates the laser light emitter for terminating emission of the laser light from the laser light emitter, prior to the second determination.

17. An apparatus for forming an image, comprising:
a scanner motor rotatably driving a polygon mirror for optical scan;
a laser light emitter emitting laser light toward the polygon mirror;
a first-periodic-signal generator detecting the laser light reflected off from the polygon mirror, thereby generating a first periodic signal dependent on a scanning period of the laser light;
a second-periodic-signal generator detecting directly or indirectly rotation of the scanner motor, thereby generating a second periodic signal dependent on a rotational speed of the polygon mirror; and
a controller performing speed control of the scanner motor, based on at least one of the first periodic signal generated from the first-periodic-signal generator, and the second periodic signal generated from the second-periodic-signal generator,
wherein the controller makes a first determination as to whether or not a pre-selected one of the first and the second periodic signal is abnormal,
wherein the controller, upon the pre-selected signal being determined to be abnormal, makes a second determination as to whether or not a remaining one of the first and the second periodic signal is normal, and
wherein the controller identifies at least one failed element of the apparatus, based on a result of the second determination;

wherein the controller implements second speed control allowing the rotational speed of the scanner motor to be controlled based on the second periodic signal, after start-up of the scanner motor, before establishment of a predetermined condition for change over, wherein the controller changes the speed control of the scanner motor into first speed control allowing the rotational speed of the scanner motor to be controlled based on the first periodic signal, after the establishment of the predetermined condition for change over, and wherein the controller identifies the at least one failed element, upon detection of an abnormality of the first periodic signal during implementation of the first speed control.

18. The apparatus according to claim 17, wherein the laser light emitter starts emission of the laser light upon establishment of a predetermined condition for start of emission, and
wherein the controller changes the speed control of the scanner motor from the second speed control to the first speed control, after start of emission of the laser light from the laser light emitter.

19. The apparatus according to claim 17, wherein the controller is inhibited from identifying the at least one failed element, during a predetermined period after change of the speed control of the scanner motor from the second speed control to the first speed control.

20. A method of controlling an apparatus for forming an image, the apparatus including:
a scanner motor rotatably driving a polygon mirror for optical scan;
a laser light emitter emitting laser light toward the polygon mirror;
a first-periodic-signal generator detecting the laser light reflected off from the polygon mirror, thereby generating a first periodic signal dependent on a scanning period of the laser light; and
a second-periodic-signal generator detecting directly or indirectly rotation of the scanner motor, thereby generating a second periodic signal dependent on a rotational speed of the polygon mirror,
the method comprising:
a speed control step of performing speed control of the scanner motor, based on at least one of the first periodic signal generated from the first-periodic-signal generator, and the second periodic signal generated from the second-periodic-signal generator;
a first determination step of making a first determination as to whether or not a pre-selected one of the first and the second periodic signal is abnormal;
a second determination step of, upon the pre-selected signal being determined to be abnormal, making a second determination as to whether or not a remaining one of the first and the second periodic signal is normal; and
a failed element identification step of identifying at least one failed element of the apparatus, based on both the a result of the second determination and the first determination that the pre-selected signal is abnormal.

21. The method according to claim 20, wherein the speed control step is effected to selectively implement first speed control allowing the rotational speed of the scanner motor to be controlled based on the first periodic signal, and second speed control allowing the rotational speed of the scanner motor to be controlled based on the second periodic signal, wherein the pre-selected signal is the first periodic signal, while the remaining signal is the second periodic signal, wherein the first determination step is effected to make a determination as to whether or not the first periodic signal is abnormal during implementation of the first speed control, as the first determination, wherein the speed control step is effected, upon the first periodic signal being determined to be abnormal, to implement the second speed control instead of the first speed control, wherein the second determination step is effected, during implementation of the second speed control, to make a determination as to whether or not the second periodic signal is normal, as the second determination, and wherein the failed element identification step is effected to identify the at least one failed element, based on both the result of the second determination and the first determination that the pre-selected signal is abnormal.

* * * * *